US010534252B2

(12) United States Patent
Minefuji

(10) Patent No.: US 10,534,252 B2
(45) Date of Patent: Jan. 14, 2020

(54) PROJECTION OPTICAL SYSTEM AND PROJECTOR

(71) Applicant: SEIKO EPSON CORPORATION, Tokyo (JP)

(72) Inventor: Nobutaka Minefuji, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 57 days.

(21) Appl. No.: 15/580,584

(22) PCT Filed: Jun. 10, 2016

(86) PCT No.: PCT/JP2016/002803
§ 371 (c)(1),
(2) Date: Dec. 7, 2017

(87) PCT Pub. No.: WO2016/199426
PCT Pub. Date: Dec. 15, 2016

(65) Prior Publication Data
US 2018/0173088 A1 Jun. 21, 2018

(30) Foreign Application Priority Data

Jun. 12, 2015 (JP) .................. 2015-119003
Apr. 7, 2016 (JP) .................. 2016-077075

(51) Int. Cl.
*G03B 21/53* (2006.01)
*G02B 13/18* (2006.01)
(Continued)

(52) U.S. Cl.
CPC ............. *G03B 21/53* (2013.01); *G02B 13/16* (2013.01); *G02B 13/18* (2013.01); *G03B 21/28* (2013.01)

(58) Field of Classification Search
CPC ........ G03B 21/18; G03B 21/16; G03B 21/14; G03B 21/28; G03B 21/53; G03B 21/00; G02B 17/08; G02B 13/18; H04N 5/74
See application file for complete search history.

(56) References Cited

U.S. PATENT DOCUMENTS 7,549,755 B2 6/2009 Suzuki
8,014,075 B2 9/2011 Minefuji
(Continued)

FOREIGN PATENT DOCUMENTS

JP 2006-235516 A 9/2006
JP 2007-079524 A 3/2007
(Continued)

OTHER PUBLICATIONS

Jul. 5, 2016 International Search Report issued in International Patent Application No. PCT/JP2016/002803.
(Continued)

*Primary Examiner* — Cara E Rakowski
*Assistant Examiner* — Danell L Owens
(74) *Attorney, Agent, or Firm* — Oliff PLC

(57) ABSTRACT

A projection optical system and that includes a relatively small number of lenses and are able to cover a wide zooming range and a projector. A 1-2 lens group which is a focus lens group is constituted with a lens which includes a single positive lens having a convex surface to the reduction side, a lens which includes a single negative meniscus lens having a convex surface to an enlargement side, and a lens which includes a single negative lens, and the 1-2 lens group is moved at the time of focusing accompanying magnification change.

17 Claims, 23 Drawing Sheets

(51) Int. Cl.
*G02B 13/16* (2006.01)
*G03B 21/28* (2006.01)

(56) References Cited

U.S. PATENT DOCUMENTS

| | | |
|---|---|---|
| 8,029,147 B2 | 10/2011 | Suzuki |
| 8,071,965 B2 | 12/2011 | Nishikawa et al. |
| 8,113,664 B2 | 2/2012 | Nagarekawa et al. |
| 8,157,386 B2 | 4/2012 | Nagarekawa et al. |
| 8,217,374 B2 | 7/2012 | Nishikawa et al. |
| 2006/0132723 A1* | 6/2006 | Yamagishi ............ G03B 21/10 353/98 |
| 2007/0273847 A1* | 11/2007 | Minami ............ G02B 27/0068 353/101 |
| 2008/0158439 A1 | 7/2008 | Nishikawa |
| 2014/0340658 A1* | 11/2014 | Takano ................ G03B 21/28 353/99 |

FOREIGN PATENT DOCUMENTS

| | | |
|---|---|---|
| JP | 2009-134254 A | 6/2009 |
| JP | 2009-216981 A | 9/2009 |
| JP | 2010-181672 A | 8/2010 |

OTHER PUBLICATIONS

Jan. 23, 2019 Extended Search Report issued in European Patent Application No. 16807133.0.

* cited by examiner

- - - - - - - - - - - -  620.0000 NM
————————  550.0000 NM
— - — - — - — -  470.0000 NM

- - - - - - - - - - - -  620.0000 NM
————————  550.0000 NM
— - — - — - — - —  470.0000 NM

- - - - - - - - - - 620.0000 NM
——————————— 550.0000 NM
— - — - — - — 470.0000 NM

- - - - - - - - - - -  620.0000 NM
———————————  550.0000 NM
— - — - — - — - —  470.0000 NM

- - - - - - - - - - 620.0000 NM
——————— 550.0000 NM
— - — - — - — - 470.0000 NM

- - - - - - - - - - 620.0000 NM
———————— 550.0000 NM
— - — - — - — - 470.0000 NM

- - - - - - - - - - - 620.0000 NM
——————————— 550.0000 NM
— · — · — · — · — · 470.0000 NM

- - - - - - - - - - - 620.0000 NM
——————————— 550.0000 NM
— · — · — · — · 470.0000 NM

- - - - - - - - - - - 620.0000 NM
―――――――― 550.0000 NM
— - — - — - — - 470.0000 NM

- - - - - - - - - - 620.0000 NM
——————— 550.0000 NM
— - - — - - — - - 470.0000 NM

```
- - - - - - - - - - - -    620.0000 NM
———————————————           550.0000 NM
— - — - — - — - — . —    470.0000 NM
```

- - - - - - - - - - 620.0000 NM
———————— 550.0000 NM
— - — - — - — 470.0000 NM

PROJECTION OPTICAL SYSTEM AND PROJECTOR

TECHNICAL FIELD

The present invention relates to a projection optical system which expands and projects an image of an image display element and is suitable to be incorporated into a projector and the projector using the projection optical system.

BACKGROUND ART

In recent years, as a projection optical system which is used for a projector and by which a large screen can be obtained by projecting an image from a short distance, a projection optical system in which a refraction optical system and a concave mirror are used is suggested (for example, see PTL 1 and PTL 2).

However, for example, in PTL 1 (JP-A-2006-235516), although a very wide viewing angle is implemented using the refraction optical system and the concave mirror, the curved mirror is very large and the entire length thereof is very long. In PTL 2 (JP-A-2007-079524), for example, a mirror size is made small by combining a concave mirror and a convex mirror while setting the viewing angle to approximately 60 degrees in an eighth example. However, similar to PTL 1 described above, the entire length is very long. Configured two mirrors are aspherical mirrors and it is very difficult to manufacture the mirrors from a viewpoint of accuracy and assembly.

As described above, in a composite optical system including the refraction optical system and the concave mirror, an ultra-wide viewing angle is obtained while it is difficult to make the entire length small. For that reason, the composite optical system is not fit for, for example, a device that places importance on portability like a front projector.

CITATION LIST

Patent Literature

PTL 1: JP-A-2006-235516
PTL 2: JP-A-2007-079524

SUMMARY OF INVENTION

Technical Problem

The invention has been made in view of the background and an object of the invention is to provide a projection optical system capable of covering a wide zooming range while having a relatively small number of lenses and a projector provided with the projection optical system.

Solution to Problem

In order to achieve the object described above, a projection optical system according to an aspect of the invention includes, in order from a reduction side, a first optical group which has positive power and includes a plurality of lenses and a second optical group which includes a single reflection surface having a concave aspherical shape, and the first optical group includes a 1-1 lens group fixed at the time of focusing accompanying magnification change and having positive power and a 1-2 lens group moved at the time of focusing accompanying the magnification change, bordering the widest air spacing, the 1-2 lens group is constituted with three lenses of an F1 lens which includes a single positive lens having a convex surface to the reduction side, an F2 lens which includes a single negative meniscus lens having a convex surface to an enlargement side, and an F3 lens which includes a single negative lens, in order from the reduction side.

In the projection optical system described above, the 1-2 lens group is arranged to the enlargement side among the first optical group and requires a relatively large lens. In the projection optical system, the 1-2 lens group includes the F1 lens which includes a single positive lens having a convex surface to the reduction side, the F2 lens which includes a single negative meniscus lens having a convex surface at an enlargement side, and the F3 lens which includes a single negative lens so that a desired zooming range can be covered. Also, the projection optical system can be compactly configured as a whole.

According to a specific aspect of the invention, the 1-1 lens group includes an aperture diaphragm inside the 1-1 lens group and includes a positive lens having a convex aspherical surface located at a position nearer to the reduction side than the aperture diaphragm. In this case, even in a case where the 1-2 lens group is simply constituted with three lenses, it is possible to obtain an image of small flare and high contrast. The number of configuring lenses is suppressed so that the entire length of the lenses can be shortened.

According to another aspect of the invention, the 1-1 lens group includes an aperture diaphragm inside the 1-1 lens group and includes a lens group including at least one positive lens located at a position nearer to the enlargement n side than the aperture diaphragm and having positive power. In this case, a state of a flux of light beams is adjusted in the 1-1 lens group that is responsible for capturing the flux of light beams emitted from an object side (hereinafter, also referred to as a light flux) and sending the flux of light beams to the 1-2 lens group to thereby make it possible to prepare a proper primary image (intermediate image) in the 1-2 lens group in a wide zooming range.

According to still another aspect of the invention, the 1-1 lens group includes an aperture diaphragm inside the 1-1 lens group and includes two positive lenses, a first cemented lens including a positive lens and a negative lens, and a second cemented lens including a positive lens and a negative lens located at a position nearer to the reduction side than the aperture diaphragm. In this case, the cemented lenses are included in the 1-1 lens group so as to make it possible to prevent, for example, occurrence of chromatic aberration.

According to still yet another aspect of the invention, the 1-1 lens group includes an aperture diaphragm inside the 1-1 lens group and a negative lens having an aspherical shape on at least one surface of the negative lens is arranged in the vicinity of the aperture diaphragm. Here, the lens arranged in the vicinity of the aperture diaphragm means a lens positioned nearest to the aperture diaphragm among the lenses constituting projection optical system. In this case, the lens arranged in the vicinity of the aperture diaphragm is formed by the negative lens having an aspherical shape on at least one surface thereof so that an object side numerical aperture can be made larger.

According to still yet another aspect of the invention, three lenses of the 1-2 lens group are divided into at least two lens groups and the two lens groups are respectively moved. In this case, even in a wide zooming range (for example, 1.5 times or more), it is possible to prepare the primary image (intermediate image) with which a good image can be obtained finally.

According to still yet another aspect of the invention, the F3 lens includes a both-side aspherical lens molded from resin. According to this configuration, it is easy to prepare a lens, like the F3 lens, which is arranged to the enlargement side among the first optical group and thus tends to become large and also has the aspherical surface on both side of the lens. There is a possibility that the F3 lens may be interfered with a light beam returning from a reflection mirror constituting the second optical group. For that reason, although a case where a portion of the lens constituting the F3 lens needs to be cut occurs, the lens is molded from resin so that it is easy to form the lens in a non-circular shape, or the like.

According to still yet another aspect of the invention, the F3 lens has a concave shape to the reduction side in the vicinity of the optical axis. In this case, it is easy to form the F2 lens in a negative meniscus lens shape having a convex surface to the enlargement side.

According to still yet another aspect of the invention, the object side numerical aperture is greater than or equal to 0.3. In this case, it is possible to form a sufficiently bright projection image.

According to still yet another aspect of the invention, the reduction side is substantially telecentric.

According to still yet another aspect of the invention, all of elements constituting the first optical group and the second optical group are rotation symmetry systems.

According to still yet another aspect of the invention, a zooming range is 1.5 times or more.

According to still yet another aspect of the invention, the 1-2 lens group has negative power as a whole.

In order to achieve the object described above, a projector according to the invention includes a light modulating element that modulates light from a light source and forms image light and the projection optical system according to any one of the projection optical systems described above that projects image light from the light modulating element. The projector includes any one of the projection optical systems described above so as to make it possible to cover a desired zooming range while implementing a configuration in which the number of lenses is suppressed.

DESCRIPTION OF EMBODIMENTS

In the following, a projection optical system according to an embodiment of the invention will be described in detail with reference to the drawings.

Figure 1:
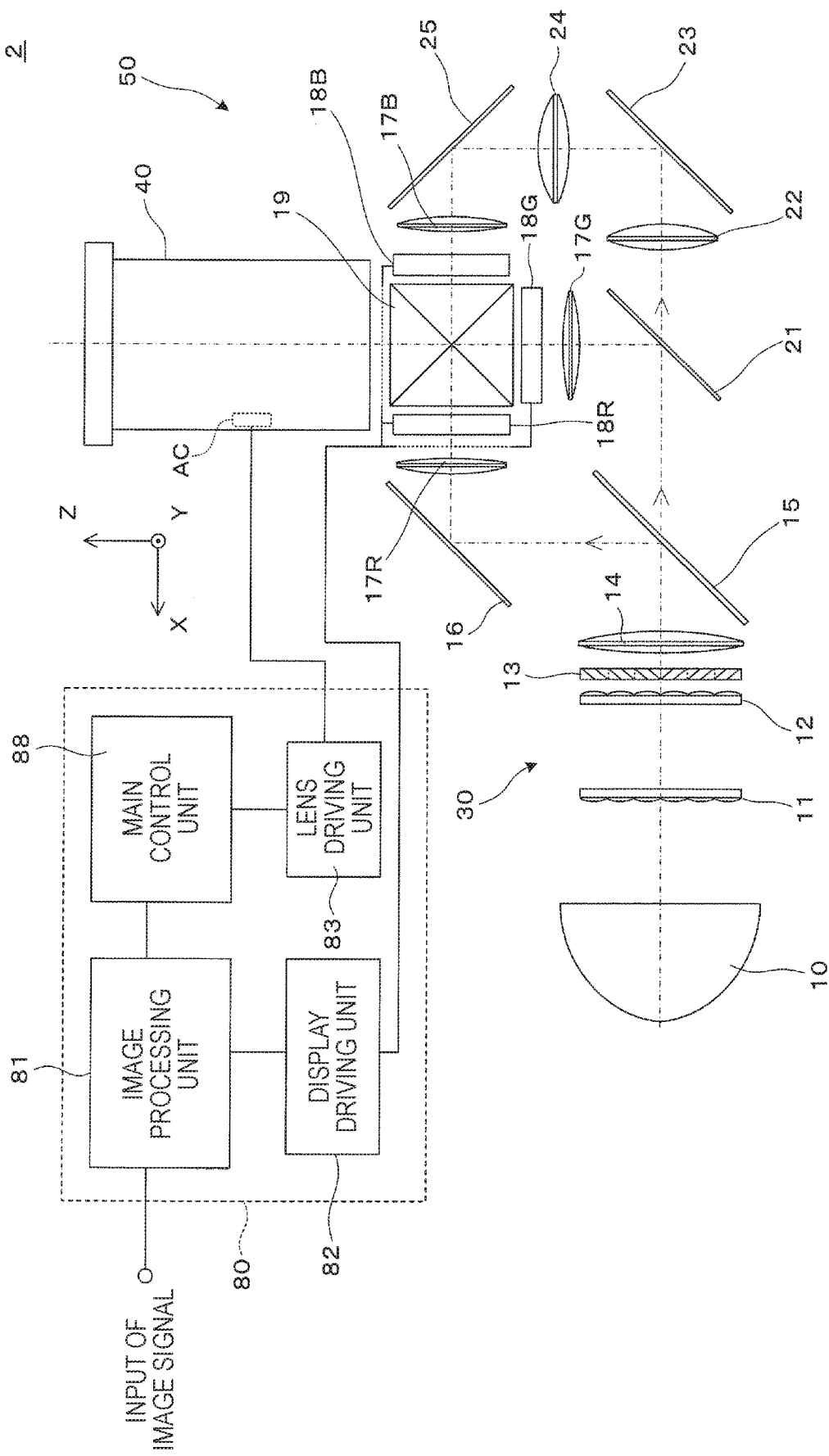
FIG. 1 is a diagram illustrating a schematic configuration of a projector incorporating a projection optical system of an embodiment.

As illustrated in FIG. 1, a projector 2 incorporating the projection optical system according to an embodiment of the invention includes an optical system portion 50 projecting image light and a circuit device 80 controlling an operation of the optical system portion 50.

In the optical system portion 50, a light source 10 is, for example, an ultra-high pressure mercury lamp and emits light including R light beam, G light beam, and B light beam. Here, the light source 10 may be a discharge light source other than the ultra-high pressure mercury lamp and may be a solid light source such as an LED or laser. A first integrator lens 11 and a second integrator lens 12 have a plurality of lens elements arranged in an array shape. The first integrator lens 11 divides light fluxes from the light source 10 into a plurality of light fluxes. Respective lens elements of the first integrator lens 11 condense the light fluxes from the light source 10 in the vicinity of the lens elements of the second integrator lens 12. The lens elements of the second integrator lens 12 cooperate with a superimposing lens 14 and form images of the lens elements of the first integrator lens on liquid crystal panels 18R, 18G, 18B. By such a configuration, the entire display area of the liquid crystal panels 18R, 18G, and 18B is illuminated with substantially uniform brightness by light from the light source 10.

A polarization conversion element 13 converts light from the second integrator lens 12 into predetermined linearly polarized light. The superimposing lens 14 superimposes images of respective lens elements of the first integrator lens 11 on the display areas of the liquid crystal panels 18R, 18G, and 18B through the second integrator lens 12.

A first dichromic mirror 15 reflects R light incident from the superimposing lens 14 and transmits G light and B light beam. R light reflected from the first dichromic mirror 15 is incident onto the liquid crystal panel 18R which is a light modulating element via a reflection mirror 16 and a field lens 17R. The liquid crystal panel 18R modulates R light according to an image signal to form an R color image.

A second dichromic mirror 21 reflects G light from the first dichromic mirror 15 and transmits B light beam. G light reflected from the second dichromic mirror 21 is incident onto the liquid crystal panel 18G which is the light modulating element via a field lens 17G. The liquid crystal panel 18G modulates G light according to an image signal to form a G color image. B light transmitted through the second dichromic mirror 21 is incident onto the liquid crystal panel 18B which is the light modulating element via relay lenses 22 and 24, reflection mirrors 23 and 25, and the field lens 17B. The liquid crystal panel 18B modulates B light beam according to an image signal to form a B color image.

A cross dichroic prism 19 is a prism for light synthesization and synthesizes light beams modulated by respective liquid crystal panels 18R, 18G, and 18B and causes synthesized light beams to be propagated as image light to the projection optical system 40.

A projection optical system 40 is a projection zoom lens that expands and projects image light which is modulated by respective liquid crystal panels 18G, 18R, and 18B and synthesized by the cross dichroic prism 19 on a screen (not illustrated).

The circuit device 80 includes an image processing unit 81 that receives an external image signal such as a video signal, a display driving unit 82 that drives the liquid crystal panels 18G, 18R, and 18B provided in the optical system portion 50 based on the output of the image processing unit 81, a lens driving unit 83 that operates a driving mechanism (not illustrated) provided in the projection optical system 40 to adjust a state of the projection optical system 40, and a main control unit 88 that comprehensively controls operations of these circuit portions 81, 82, and 83.

The image processing unit 81 converts the input external image signal into an image signal including gradation of each color or the like. The image processing unit 81 also can perform various image processing such as distortion correction or color correction on the external image signal.

The display driving unit 82 can operate the liquid crystal panels 18G, 18R, and 18B based on the image signal output from the image processing unit 81 and can form an image corresponding to the image signal or an image corresponding to the image obtained by being subjected to image processing in the liquid crystal panels 18G, 18R, and 18B.

The lens driving unit 83 operates under control of the main control unit 88 and appropriately moves some of optical elements constituting the projection optical system 40 along an optical axis OA through an actuator AC to thereby make it possible to perform focusing accompanying zooming (focusing when varying power) in projection of an image onto a screen by the projection optical system 40. The lens driving unit 83 can change a vertical position of an image to be projected on the screen through tilt adjustment by moving the entirety of projection optical system 40 in the up and down direction perpendicular to the optical axis OA.

Figure 2:
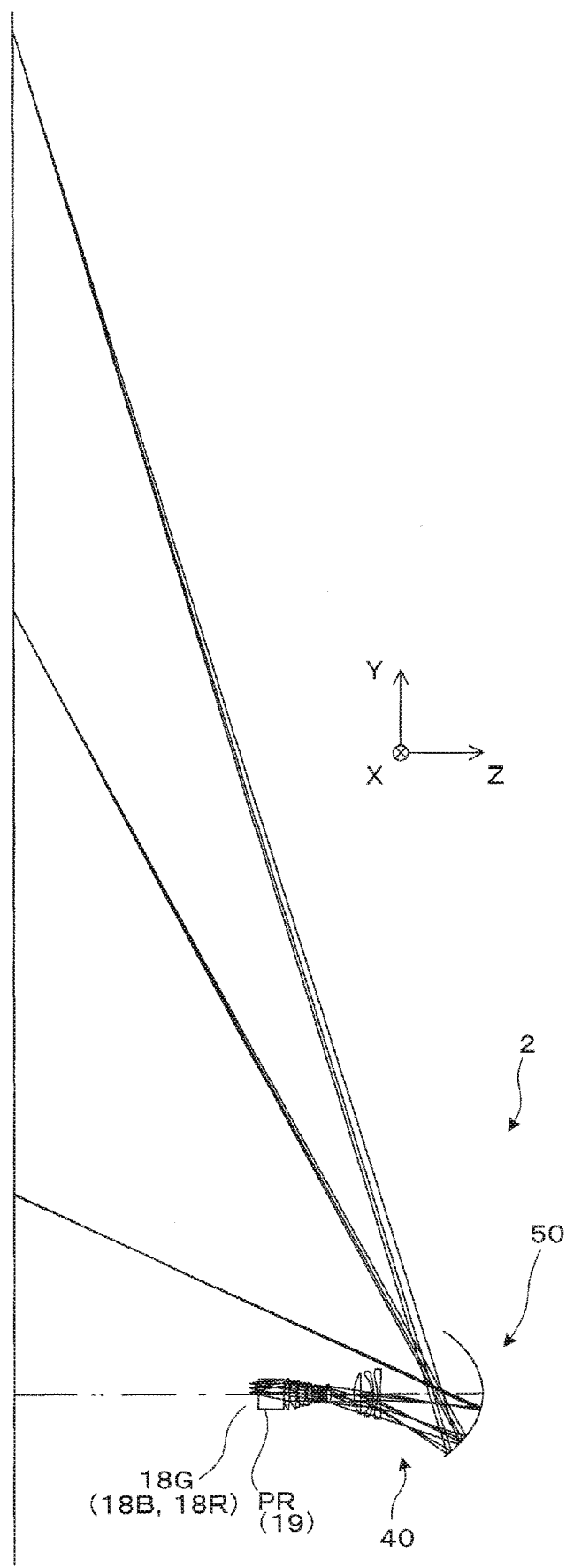
FIG. 2 is a view of a configuration and light beams from an object surface to a projection surface in a projection optical system of the embodiment or Example 1.
Figure 3:
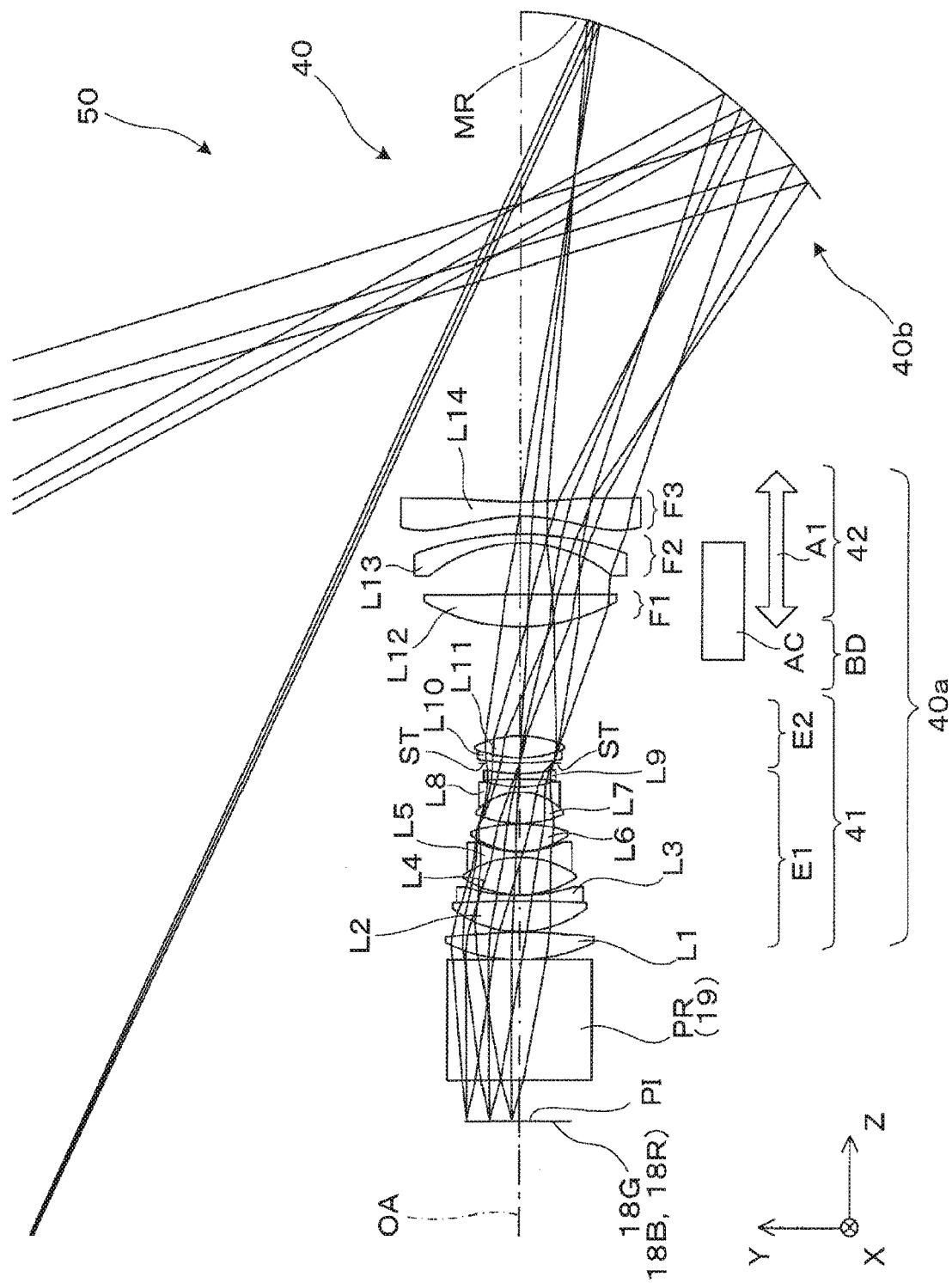
FIG. 3 is a partial enlarged view from object surface to a concave reflection mirror of FIG. 2.

In the following, the projection optical system 40 of the embodiment will be described in detail with reference to FIG. 2 and FIG. 3. The projection optical system 40 illustrated in FIG. 2 or the like has the same configuration as that of the projection optical system 40 of Example 1 which will be described later.

The projection optical system 40 of the embodiment projects the image formed on the liquid crystal panel 18G (18R, 18B) on a screen (not illustrated). Here, a prism PR corresponding to the cross dichroic prism 19 of FIG. 1 is arranged between the projection optical system 40 and the liquid crystal panel 18G (18R, 18B).

The projection optical system 40 includes a first optical group 40a including a plurality of lenses in order from the reduction side and having positive power and a second optical group 40b constituted with a mirror MR that includes a reflection surface having a concave aspherical shape. The first optical group 40a includes a 1-1 lens group 41 provided at a reduction side and having positive power and a 1-2 lens group 42 provided at an enlargement side and having weak negative power compared to power of the 1-1 lens group 41 bordering the widest air spacing BD among space formed between lenses included in the first optical group.

The 1-1 lens group 41 includes an aperture diaphragm ST inside the 1-1 lens group 41 and includes a lens group E1 located at position nearer to the reduction side than the aperture diaphragm ST and a lens group E2 located at position nearer to the enlargement side than the aperture diaphragm ST.

The 1-2 lens group 42 includes an F1 lens (hereinafter, referred to as lens F1), an F2 lens (hereinafter, referred to as lens F2), and an F3 lens (hereinafter, referred to as lens F3) in order from the reduction side. The lens F1, the lens F2, and the lens F3 are respectively moved in the optical axis direction at the time of focusing accompanying the magnification change. Among the lenses F1 to F3, the lens F1 located at a position nearest to the reduction side is a positive lens (lens L12) having a convex surface on the reduction side, the lens F2 positioned between the lens F1 and the lens F3 is a negative meniscus lens (lens L13) having a convex surface on the enlargement side, and the lens F3 located at a position nearest to the enlargement side is a negative lens (lens L14). The lens F3 is a both-side aspherical lens molded from resin and has a concave shape to the reduction side in the vicinity of the optical axis. The lenses F1 to F3 are moved in a direction A1 along the optical axis OA by the actuator AC at the time of focusing when varying power. Here, the lenses F1 and F2 are made movable integrally with each other and the lens F3 is made movable independently of the lenses F1 and F2. That is, the lenses F1 to F3 are divided into at least two lens groups (a lens group including lenses F1 and F2 and a lens group including lens F3) and respective lens groups are movable independently of each other. With this, even in a wide the magnification change range, it is possible to prepare the primary image with which a good image can be obtained finally. For a way of moving the lenses F1 to F3 by the actuator AC, various aspects by aspects of focusing when varying power are possible. For example, the lenses F1 to F3 may be moved completely and independently of each other and may be moved by being interlocked with each other using a cam mechanism or the like.

In the following, lenses constituting each lens group will be described in order from the reduction side. The lens group E1 includes lenses L1 to L9 and the lens group E2 includes lenses L10 and L11. The lens F1 is constituted with the lens L12, the lens F2 is constituted with the lens L13, and the lens F3 is constituted with the lens L14. That is, the first optical group 40a is constituted with fourteen lenses of the lenses L1 to L14 as a whole.

Each of the lenses L2, L4, L6, and L7 is the positive lens and each of the lenses L3, L5, and L8 is the negative lens. The lens L2 and the lens L3 are the first cemented lens and the lens L4 and the lens L5 are the second cemented lens. The lens L6 has a convex aspherical surface. The lens L7 and the lens L8 form a cemented lens. The 1-1 lens group 41 includes at least two sets (here, three sets) of cemented lenses including the positive lens and the negative lens that are provided at a position nearer to the reduction side than the aperture diaphragm ST and at least one positive lens having the convex aspherical surface. Each of the lenses L1 to L9 is a lens made of glass and has a circular shape axially symmetrical to the optical axis OA. All lenses other than the lens L6 are spherical lenses.

The lens L10 which is a negative meniscus lens and the lens L11 which is a biconvex positive lens forms a cemented lens. When considering the way of viewing, the lens group E2 may be referred to as a lens group including at least one positive lens (lens L11) and having positive power. In this case, a state of a flux of light beams is adjusted in the 1-1 lens group 41 that is responsible for capturing a flux of light beams emitted from an object side, that is, panel surface PI and sending the flux of light beams to the 1-2 lens group to thereby prepare a proper primary image (intermediate image) in the 1-2 lens group 42 in a wide zooming range. The lenses L10 and L11 are spherical lenses made of glass and have a circular shape axially symmetrical to the optical axis OA.

As described above, the 1-1 lens group 41 is constituted with eleven lenses of the lenses L1 to L11 as a whole. The projection optical system 40 according to the present embodiment can reduce chromatic aberration by a relatively small number of lenses. Furthermore, it is possible to make the numerical aperture large. The influence by variation in assembling is small. Furthermore, the aspherical positive lens (L6) made of glass is provided to the reduction side (lens group E1) of the aperture diaphragm ST and thus, it is possible to obtain an image of small flare and of high contrast even when the 1-2 lens group 42 is simply constituted with three lenses of the lenses F1 to F3. The number of configuring lenses of the lens group is suppressed so that the entire length of the lenses can be shortened.

The lens L12 is the positive lens having a convex surface on at least the reduction side. The lens L12 is responsible for making the aberration correction by the lens L13 and the lens L14 easy at the time of focusing as well as responsible for converting the light flux emitted as divergent light from the 1-1 lens group 41 into a state of being close to parallel light and guiding the converted light to the lens L13. In a case where a surface to the reduction side of the lens L12 is a flat surface or a convex surface, the aberration correction effect in the surface to the reduction side is small and thus, aberration correction by the lens L13 and the lens L14 becomes difficult. Accordingly, the F1 lens is preferably formed by a positive lens having a convex surface to the reduction side. The lens L12 is a spherical lens made of glass and has a circular shape axially symmetrical to the optical axis OA.

The lens L13 is a negative meniscus lens having a convex surface to the enlargement side. The lens L13 cooperates with the lens L12 to prepare a good primary image at the time of focusing. The lens L13 has a divergence surface including a concave surface to the reduction side to thereby make it possible to correct aberration with the lens L12 at the time of focusing with good balance. The lens L13 has a light condensing surface including a convex surface to the enlargement side to thereby make it possible to suppress divergence of light beams to be incident onto the lens L14 and to lessen the influence by variation of the lens L14 which is subjected to strong aspherical surface machining. The lens L13 is a spherical lens made of glass and has a circular shape axially symmetrical to the optical axis OA.

As described above, the lens L14 is a both-side aspherical lens having negative power in the vicinity of the optical axis OA and is molded from resin. The lens L14, that is, the lens F3 is an aspherical lens of a shape having a concave surface to the reduction side so that it is easy to form the lens L13, that is, the lens F2 in a negative meniscus lens shape having a convex surface to the enlargement side. The lens L14 may have a circular shape axially symmetrical to the optical axis OA and may also have a noncircular shape. For instance, the lens L14 may have a shape in which a portion of an upper side, which is circular and axially symmetrical to the optical axis OA (a side to which video light is projected), is cut.

As previously described, the second optical group 40b is constituted with the mirror MR having a concave aspherical shape. The mirror MR reflects video light emitted from the first optical group 40a towards the screen.

As described above, each of the lenses L1 to L14 constituting the first optical group 40a has a circular shape axially symmetrical to the optical axis OA or at least the lens L14 has a shape in which a portion of an upper side, which is circular and axially symmetrical to the optical axis OA, is cut. Also, the mirror MR constituting the second optical group 40b has a shape in which a portion, which is axially symmetrical to the optical axis OA, is cut. That is, the respective lenses L1 to L14 and the reflection surface formed on the mirror MR are rotation symmetry systems. As illustrated, the reduction side is substantially telecentric in the projection optical system 40. With this, for example, as described above, in a case where light beams modulated by respective liquid crystal panels 18R, 18G, and 18B are synthesized to be formed into image light in the cross dichroic prism 19, it is possible to easily absorb variation in assembling.

In a proximity projection optical system, in general, a distance to a screen is very short. In the projection optical system 40, an image formed on a panel surface PI of the liquid crystal panel 18G (18R, 18B) is formed once in front of the mirror of the second optical group 40b by the first optical group 40a and the image is formed on the screen by the second optical group 40b again so that a proximity projection is performed. That is, the first optical group 40a prepares the primary image (intermediate image) in front of the mirror MR. In the proximity projection optical system described above, variation of aberration when varying power is relatively large and thus, there is a possibility that zooming range cannot be made large. Accordingly, the primary image formed by the first optical group 40a is preferably optimized so that a good image is obtained even when the projection magnification is changed. In a general proximity projection optical system, reduction in contrast due to variation of astigmatism or image surface curvature is large. Change in distortion aberration when varying power is likely to be higher than that of a normal lens.

However, in the projection optical system 40 of the present embodiment, as described above, although the 1-2 lens group 42 which is a focus lens group is constituted with three lenses (a single positive lens and two negative lenses) and has a simple configuration in which an aspherical lens is only a single negative lens (lens L14) nearest to the enlargement side, the 1-2 lens group 42 is movable along the optical axis OA and thus, a desired zooming range can be covered. Furthermore, the projection optical system can be made compact and is capable of achieving cost reduction. More specifically, three lenses constituting the 1-2 lens group 42 are divided into at least two lens groups and at least the two lens groups are individually movable in order to form a good image in a wide magnification change range, at the time of focusing accompanying the magnification change. In the 1-2 lens group 42, an angle of a divergent light flux from the 1-1 lens group 41 is gently angled and is made incident onto the next negative lens (lens F2, that is, lens L13) by the positive lens (lens F1, that is, lens L12) arranged to the reduction side, and the lens F2 favorably relays the light flux without worsening corrected aberration, an image is formed while diverting further the light flux by the negative lens (lens F3, that is, lens L14) arranged to the enlargement side, so that a required primary image (intermediate image) is prepared.

In the present embodiment, in the 1-1 lens group 41 constituting a fixed group which is not moved at the time of focusing, for example, an aspherical surface (lens surface of lens L6) formed of glass is arranged to the reduction side of the aperture diaphragm ST so that variation of aberration is made small even in a wide magnification change range without increasing sensitivity of the aspherical lens made of resin (lens L14). More specifically, first, the plurality of lenses L1 to L9 of the 1-1 lens group 41 arranged at a position nearer to the reduction side (lens group E1) than the aperture diaphragm ST, as previously described, efficiently capture a flux of light beams emitted from the panel surface PI. Here, in a case where the 1-1 lens group 41 including the lenses L1 to L9 is constituted only with the spherical lenses, the number of lenses is increased. However, in the projection optical system 40, when the number of lenses is increased, transmittance is reduced and the entire length of the lenses is increased so that the number of lenses of a lens configuration as little as possible is required. Furthermore, in a case where the 1-2 lens group 42 is constituted with three lenses, which are the minimum number of lenses of a lens configuration, as described above, a flux of light beams incident onto the 1-2 lens group 42 also needs to be properly controlled. In contrast, in the present embodiment, the 1-1 lens group 41 includes at least one convex shaped aspherical surface so that occurrence of flare can be suppressed and an image of high contrast can be provided. At least two lenses (L10, L11) are arranged to the enlargement n side (lens group E2) of the aperture diaphragm ST in the 1-1 lens group 41 so that a proper intermediate image is more reliably prepared in the 1-2 lens group 42 in a wide zooming range. The lens F3 constituted with a lens having an aspherical shape while having negative power, among the 1-2 lens group 42, cooperates with the second optical group 40*b* constituted with the mirror MR having the concave aspherical shape to perform a final correction of an amount of aberration. The second optical group 40*b* is the reflection surface onto which light fluxes having respective image heights are incident by being separated and the lens F3 arranged immediately before the second optical group 40*b* among the first optical group 40*a* is formed by an aspherical lens so that it is possible to effectively perform optimal correction to respective image heights. By adopting the configuration as described above, even in a case where the 1-2 lens group 42 constituting a focus lens group is formed with three lenses, the number of lenses of the entire projection optical system 40 is approximately thirteen or fourteen, and the second optical group 40*b* is constituted with a single mirror MR, proper aberration is included in the primary image so as to enable an image, which is to be projected on a screen via the second optical group 40*b*, to be a good image having small aberration. That is, in the projector 2 which is a proximity projector, it is possible to cover a wide zooming range and also cope with an image display element of high resolution.

Furthermore, by adopting the configuration as described above, the projection optical system of the present embodiment has performance capable of coping with the image display element of high resolution by securing a high zooming range of 1.5 times or more (furthermore, 1.6 times or more) while setting object side numerical aperture to be greater than or equal to 0.27, that is, having brightness of the extent of the F-number of 1.8. As will be described later in Example 3, the glass aspherical surfaces are properly arranged so as to make it possible to suppress the number of configuring lenses of the lens group and shorten the entire length of the lenses. As will be described later in Example 4, the glass aspherical surfaces are properly arranged in the vicinity of the aperture diaphragm ST so as to make it possible to obtain an image having small flare and high contrast while setting the numerical aperture to be greater than or equal to 0.3, that is, having brightness of the extent of the F-number of 1.6.

EXAMPLE

In the following, a specific example of the projection optical system 40 will be described. Meaning of specification common to Examples 1 to 4 which will be described in the following is summarized below.

f focal distance of entire system
ω half viewing angle
NA numerical aperture
R curvature radius
D axial surface spacing (lens thickness or lens spacing)
Nd refractive index of d-line
Vd Abbe number of d-line The aspherical surface is specified by the following polynomial (aspherical expression).

$$z = \frac{ch^2}{1+\sqrt{1-(k+1)c^2h^2}} + A_4h^4 + A_6h^6 + A_8h^8 + A_{10}h^{10} + A_{12}h^{12} + A_{14}h^{14}$$

Where,
c: curvature (1/R)
h: height from optical axis
k: conical coefficient of aspherical surface
Ai: high-order aspherical coefficient of aspherical surface
The OBJ means the panel surface PI, the STO means the aperture diaphragm ST, and the IMG means an image surface on a screen (a projection surface). A surface for which the mark "*" is described before the surface number is a surface having an aspherical shape.

Example 1

Data of the lens surfaces of Example 1 is listed in the following Table 1.

TABLE 1

| f 3.716 ω 72.8° NA 0.278 | | | | |
|---|---|---|---|---|
| | R | D | Nd | Vd |
| OBJ | Infinity | 8.700 | | |
| 1 | Infinity | 26.840 | 1.51633 | 64.14 |
| 2 | Infinity | 0.000 | | |
| 3 | 37.319 | 6.138 | 1.61800 | 63.39 |

TABLE 1-continued f 3.716 ω 72.8° NA 0.278

| | R | D | Nd | Vd |
|---|---|---|---|---|
| 4 | −133.798 | 0.200 | | |
| 5 | 23.872 | 6.923 | 1.49700 | 81.54 |
| 6 | −264.396 | 1.200 | 1.80518 | 25.42 |
| 7 | 36.078 | 0.200 | | |
| 8 | 22.107 | 8.505 | 1.48749 | 70.24 |
| 9 | −21.997 | 1.200 | 1.83400 | 37.16 |
| 10 | 21.503 | 0.100 | | |
| *11 | 15.632 | 6.259 | 1.58913 | 61.15 |
| *12 | −37.637 | 0.100 | | |
| 13 | 23.994 | 7.021 | 1.76182 | 26.52 |
| 14 | −13.000 | 1.100 | 1.90366 | 31.31 |
| 15 | 23.666 | 1.781 | | |
| 16 | −178.477 | 1.200 | 1.79952 | 42.22 |
| 17 | 35.531 | 2.353 | | |
| STO | Infinity | 0.000 | | |
| 19 | 50.623 | 1.200 | 1.83400 | 37.16 |
| 20 | 26.471 | 4.758 | 1.68893 | 31.07 |
| 21 | −23.883 | variable spacing | | |
| 22 | 43.859 | 7.234 | 1.48749 | 70.24 |
| 23 | 8927.895 | 11.507 | | |
| 24 | −31.802 | 2.000 | 1.80518 | 25.42 |
| 25 | −65.670 | variable spacing | | |
| *26 | −37.988 | 3.080 | 1.53116 | 56.04 |
| *27 | 79.666 | variable spacing | | |
| *28 | −56.904 | variable spacing | | |
| IMG | Infinity | | | |

In Table 1 described above and the following tables, a value of the power of 10 (for example, $1.00 \times 10^{+18}$) is represented by using E (for example, 1.00E+18).

The following Table 2 lists aspherical coefficients of the lens surfaces of Example 1.

TABLE 2

| | | | aspherical coefficient | | | |
|---|---|---|---|---|---|---|
| K | A04 | A06 | A08 | A10 | A12 | A14 |
| 11 −0.3254 | −4.0562E−05 | −3.8171E−08 | 1.6672E−09 | −5.9264E−12 | 0.0000E+00 | 0.0000E+00 |
| 12 −1.0000 | −3.0034E−06 | −1.3441E−07 | 1.1456E−09 | −4.6079E−12 | 0.0000E+00 | 0.0000E+00 |
| 26 −8.9406 | −4.1419E−06 | 4.2736E−08 | −7.7451E−11 | 7.8109E−14 | −3.2998E−17 | 0.0000E+00 |
| 27 0.0000 | −2.0077E−05 | 4.1069E−08 | −7.3163E−11 | 9.4882E−14 | −6.5519E−17 | 1.9494E−20 |
| 28 −2.0932 | −7.0770E−07 | 9.1586E−11 | −3.1672E−14 | 7.2156E−18 | −9.7659E−22 | 4.7976E−26 |

The following Table 3 lists values of variable spacing 21, 25, 27, and 28 of Table 1 in the projection magnification of 125 times magnification, the projection magnification of 101 times magnification, and the projection magnification of 169 times magnification.

TABLE 3

| | variable spacing | | |
|---|---|---|---|
| | 125x | 101x | 169x |
| 21 | 24.547 | 23.760 | 25.343 |
| 25 | 4.000 | 4.520 | 3.409 |
| 27 | 109.855 | 110.122 | 109.650 |
| 28 | −501.000 | −408.310 | −665.306 |

Figure 4:
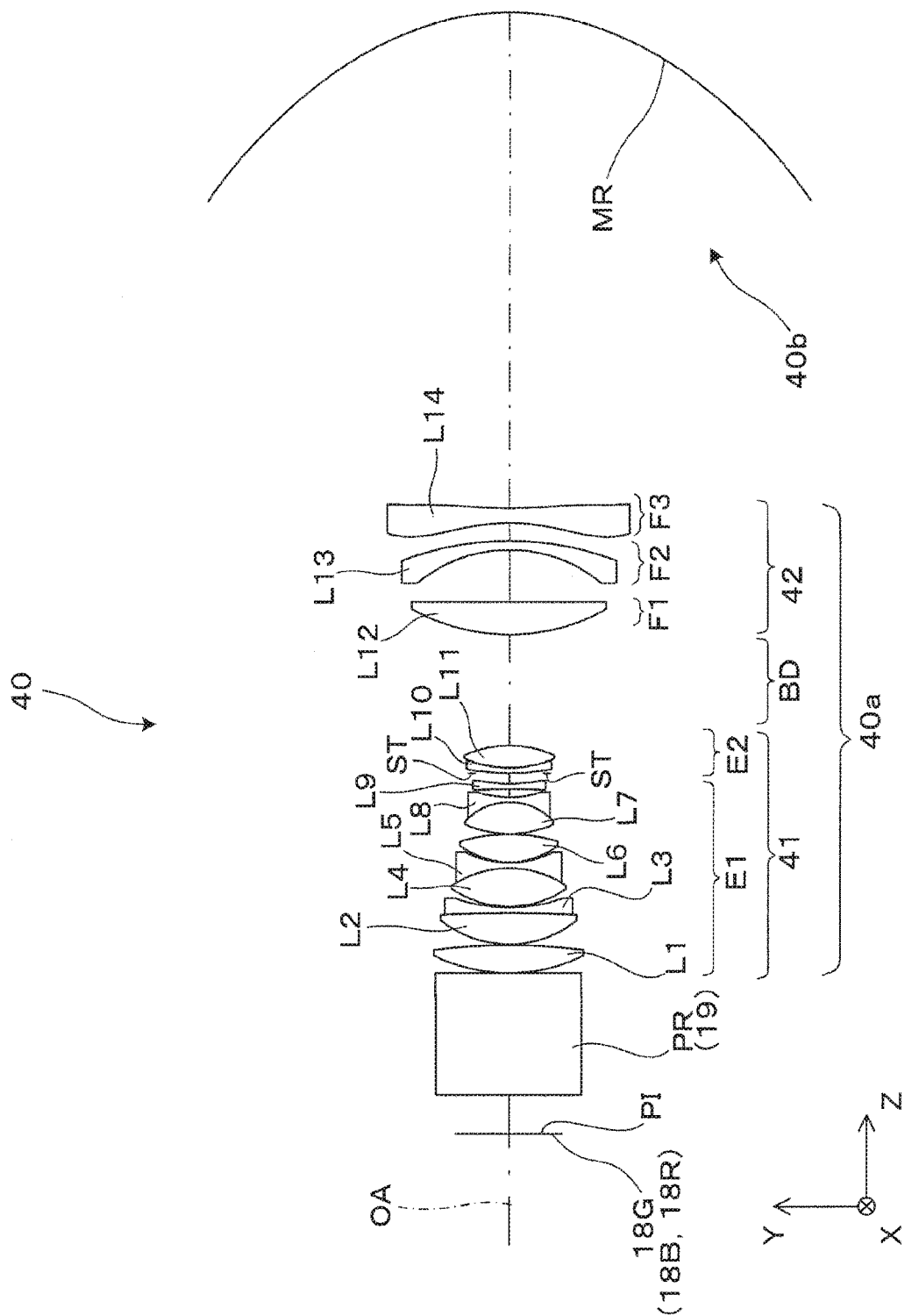
FIG. 4 is a diagram illustrating a configuration of a projection optical system of Example 1.

FIG. 4 is a cross-sectional view of the projection optical system 40 of Example 1. The projection optical system 40 of FIG. 4 corresponds to the projection optical system 40 of the embodiment 1. In FIG. 4, the projection optical system 40 expands and projects an image on the panel surface PI with the magnification according to a distance to the screen. The projection optical system 40, includes fourteen lenses L1 to L14 of lenses L1 to L9 constituting the lens group E1, lenses L10 and L11 constituting the lens group E2 of the 1-1 lens group 41, the lens L12 constituting the lens F1, the lens L13 constituting the lens F2, and the lens L14 constituting the lens F3 of the 1-2 lens group 42, in order from the reduction side. For example, the projection position is changed (projection distance is changed) to thereby varying of power is performed as in the case where it is changed from the wall surface projection to the floor surface projection. The lenses F1 to F3 are respectively moved while the 1-1 lens group 41 is fixed as it is, at the time of focusing accompanying the magnification change. Here, in the 1-2 lens group 42, when varying power, the lenses F1 and F2 among three lenses of the lenses F1, F2, and F3 are integrally moved and the lens F3 is moved independently of the lenses F1 and F2 so as to perform focusing.

When details of the lenses L1 to L14 are described, the lens L1 which is a first lens is a biconvex positive lens, the lens L2 which is a second lens is the biconvex positive lens, the lens L3 which is a third lens is a biconcave negative lens, the second lens and the third lens are the cemented lens, the lens L4 which is a fourth lens is the biconvex positive lens, the lens L5 which is a fifth lens is the biconcave negative lens, the fourth lens and the fifth lens are the cemented lens, the lens L6 which is a sixth lens is the biconvex positive lens of which both surfaces are formed by aspherical surface, the lens L7 which is a seventh lens is the biconvex positive lens, the lens L8 which is an eighth lens is the biconcave negative lens, the seventh lens and the eighth lens are the cemented lens, the lens L9 which is a ninth lens is the biconcave negative lens, the lens L10 which is a tenth lens and located at the rear stage of the aperture diaphragm ST is the biconcave negative lens, the lens L11 which is an eleventh lens is the biconvex positive lens, and the tenth lens and the eleventh lens are the cemented lens. The lens L12 which is a twelfth lens is the biconvex positive lens (that is, a positive lens having a convex surface on at least reduction side), the lens L13 which is a thirteenth lens is a negative meniscus lens having a convex surface on the enlargement side, and the lens L14 which is a fourteenth lens is a negative lens of which both surfaces are formed by aspherical surfaces and which has a biconcave shape in the vicinity of the optical axis. The lens L14 is a lens molded from resin. The second optical group 40b is constituted with a single concave aspherical mirror.

Figure 5A:
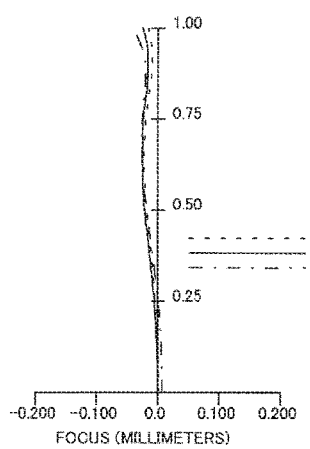
FIGS. 5(A) to 5(C) are reduction side aberration diagrams of the projection optical system of Example 1.
Figure 5A:
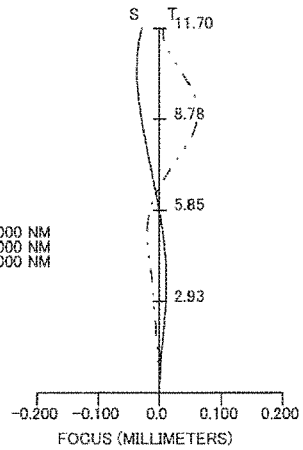
Figure 5A:
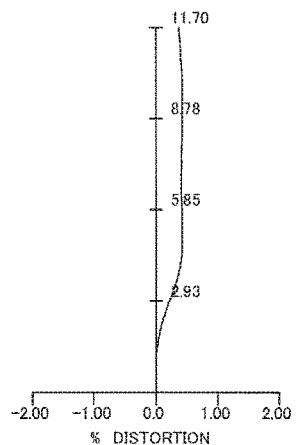
Figure 5B:
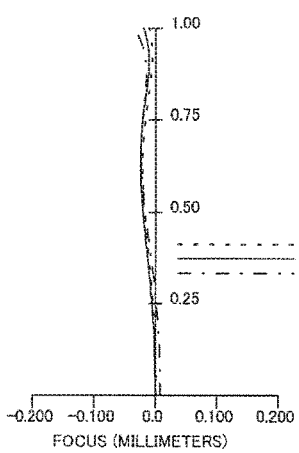
Figure 5B:
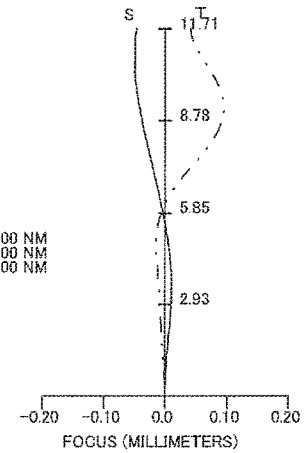
Figure 5B:
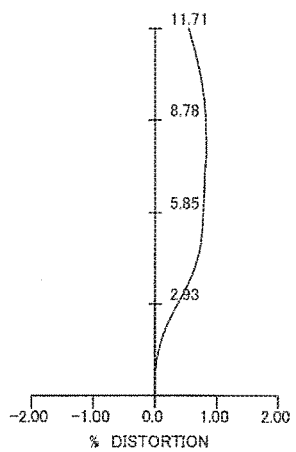
Figure 5C:
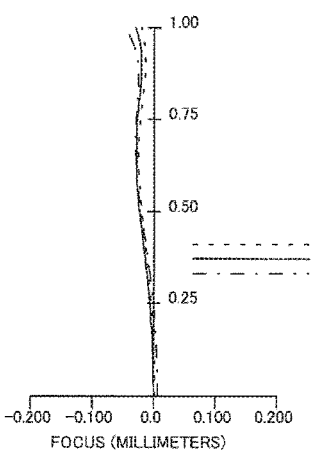
Figure 5C:
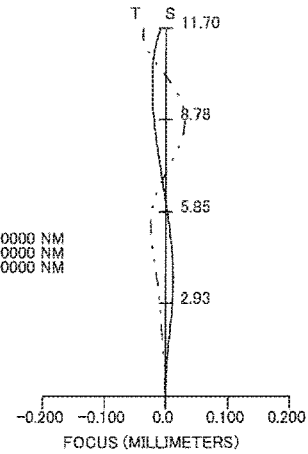
Figure 5C:
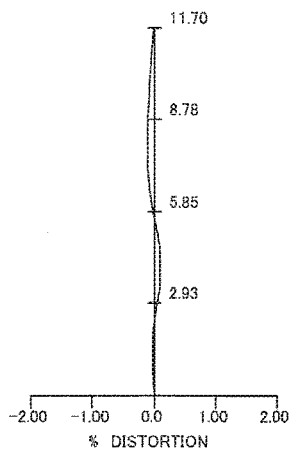
Figure 6A:
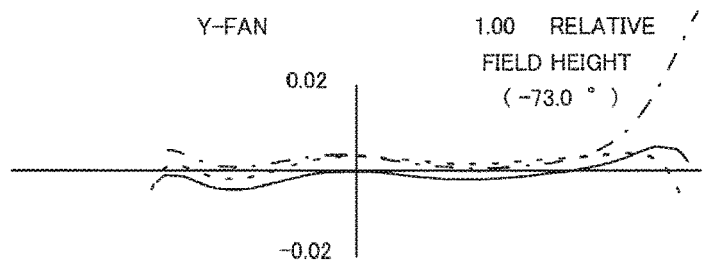
FIGS. 6(A) to 6(E) are lateral aberration diagrams of the projection optical system corresponding to FIG. 5(A).
Figure 6A:
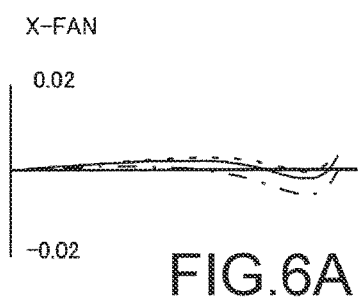
Figure 6B:
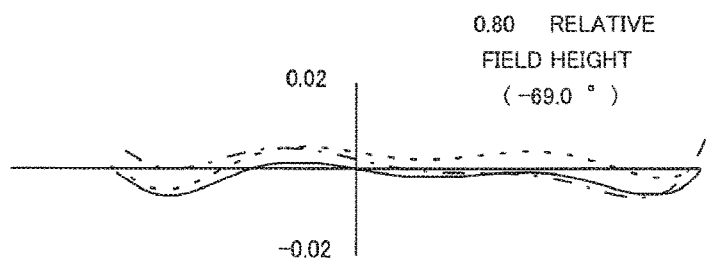
Figure 6B:
Figure 6C:
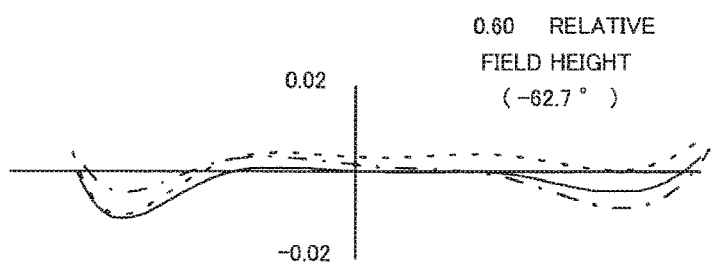
Figure 6C:
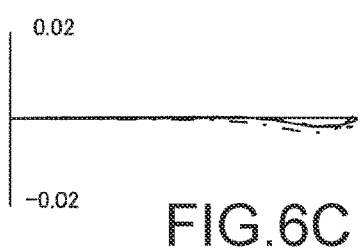
Figure 6D:
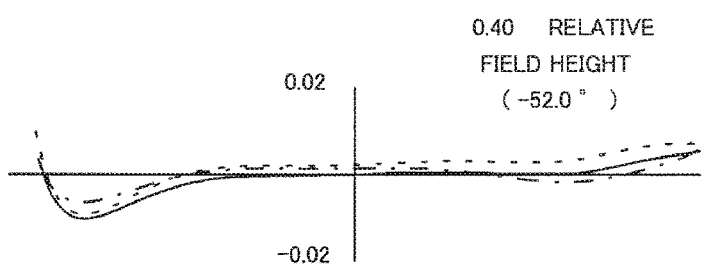
Figure 6D:
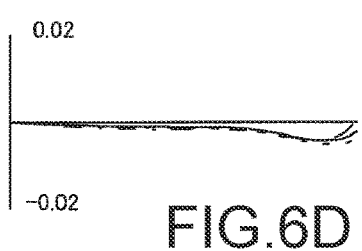
Figure 6E:
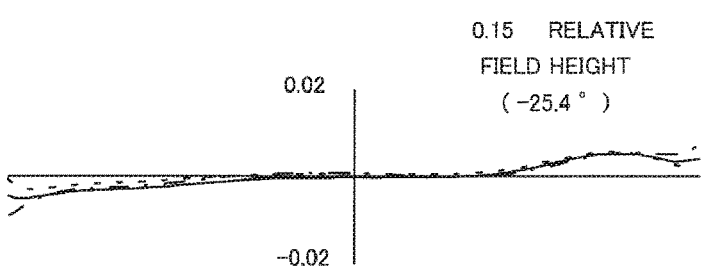
Figure 6E:
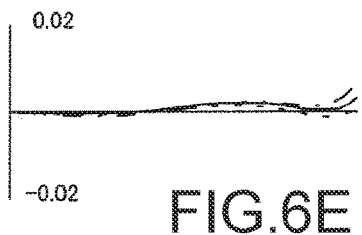
Figure 7A:
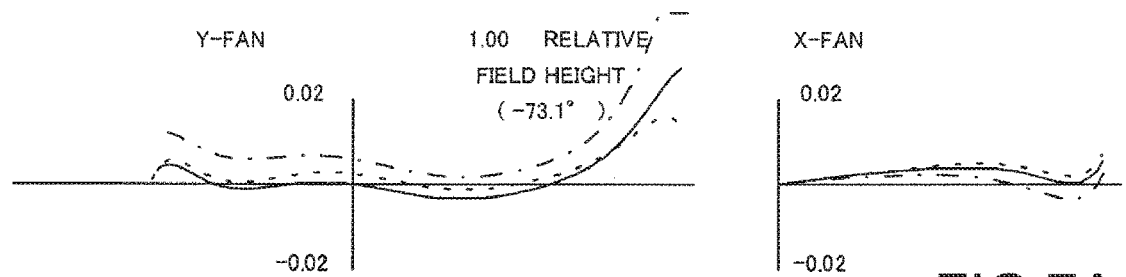
FIGS. 7(A) to 7(E) are lateral aberration diagrams of the projection optical system corresponding to FIG. 5(B).
Figure 7B:
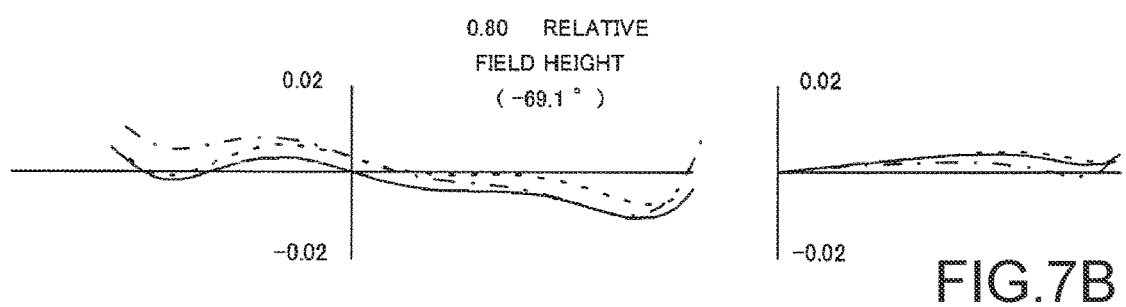
Figure 7C:
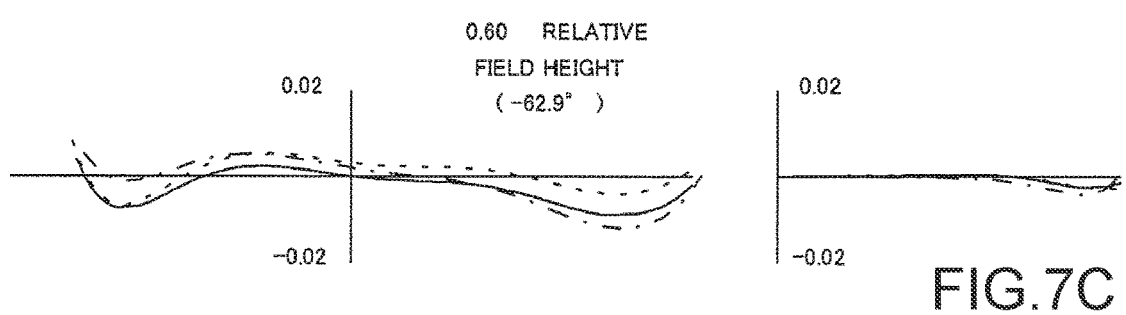
Figure 7D:
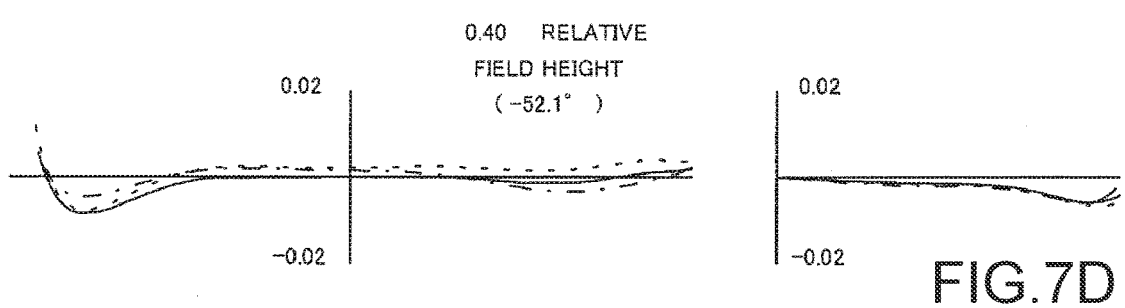
Figure 7E:
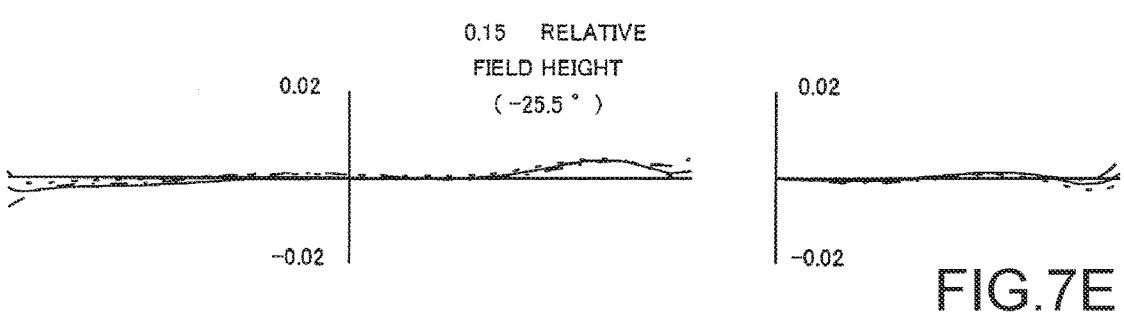
Figure 8A:
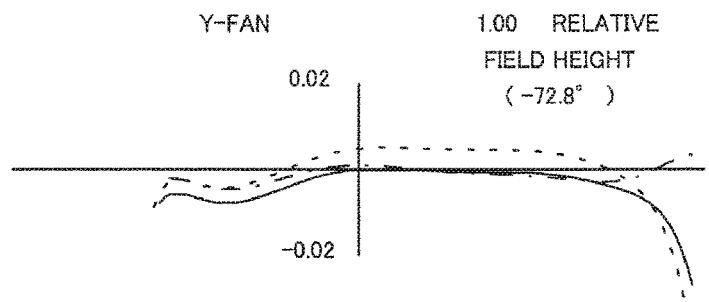
FIGS. 8(A) to 8(E) are lateral aberration diagrams of the projection optical system corresponding to FIG. 5(C).
Figure 8A:
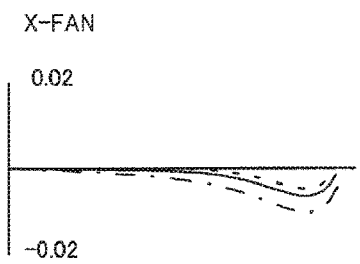
Figure 8B:
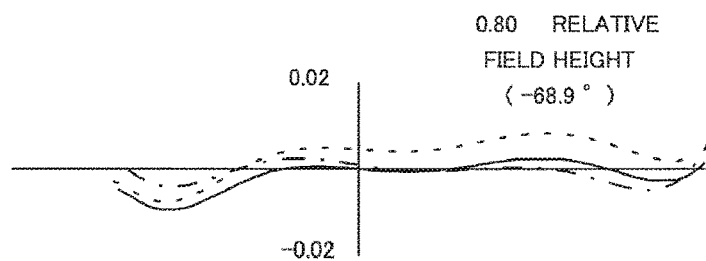
Figure 8B:
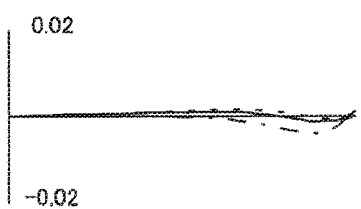
Figure 8C:
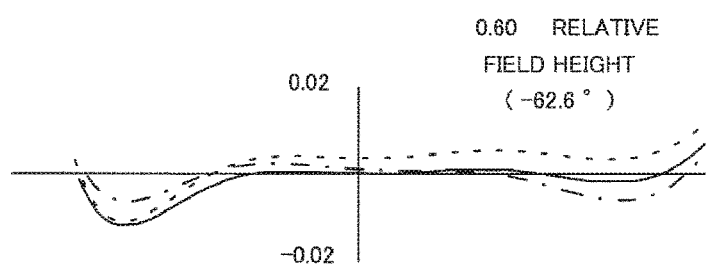
Figure 8C:
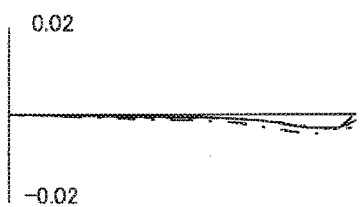
Figure 8D:
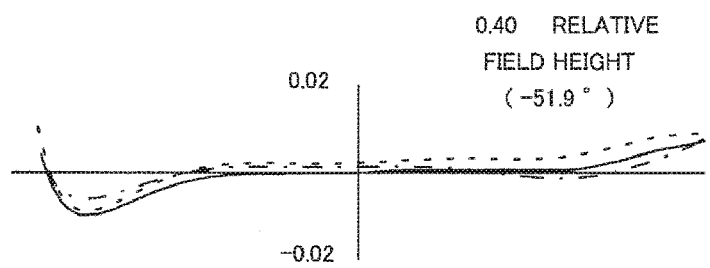
Figure 8D:
Figure 8E:
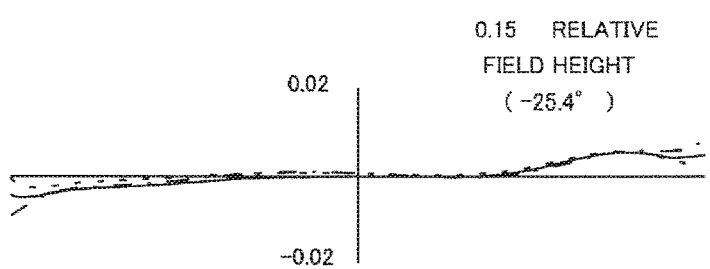
Figure 8E:
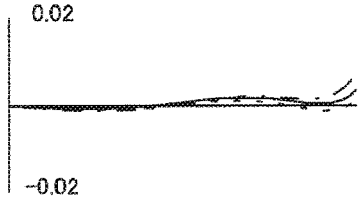

FIG. 5(A) is a reduction side aberration (spherical aberration, astigmatism, distortion aberration) diagram of the projection optical system when projection magnification is 125 times magnification, FIG. 5(B) is a reduction side aberration diagram of the projection optical system when projection magnification is 100 times magnification, and FIG. 5(C) is a reduction side aberration diagram of the projection optical system when projection magnification is 169 times magnification. FIGS. 6(A) to 6(E) are lateral aberration diagrams of the projection optical system corresponding to FIG. 5(A). FIGS. 6(A) to 6(E) represent lateral aberrations in the image heights of 100%, 80%, 60%, 40%, and 15%, respectively. FIG. 6(A) corresponds to a case of the maximum viewing angle. Similarly, FIGS. 7(A) to 7(E) are lateral aberration diagrams of the projection optical system corresponding to FIG. 5(B) and FIGS. 8(A) to 8(E) are lateral aberration diagrams of the projection optical system corresponding to FIG. 5(C).

Example 2

Data of the lens surfaces of Example 2 is listed in the following Table 4.

TABLE 4 f 3.716 ω 72.8° NA 0.278

|  | R | D | Nd | Vd |
|---|---|---|---|---|
| OBJ | Infinity | 8.700 |  |  |
| 1 | Infinity | 0.000 |  |  |
| 2 | Infinity | 26.840 | 1.51633 | 64.14 |
| 3 | Infinity | 0.000 |  |  |
| 4 | 43.228 | 6.423 | 1.61800 | 63.39 |
| 5 | −83.194 | 0.200 |  |  |
| 6 | 23.780 | 7.928 | 1.49700 | 81.54 |
| 7 | −79.179 | 1.200 | 1.84666 | 23.78 |
| 8 | 46.000 | 0.200 |  |  |
| 9 | 35.223 | 7.666 | 1.48749 | 70.24 |
| 10 | −22.326 | 1.200 | 1.83400 | 37.16 |
| 11 | 41.000 | 0.100 |  |  |
| *12 | 23.142 | 5.529 | 1.58913 | 61.15 |
| *13 | −55.168 | 0.100 |  |  |
| 14 | 33.722 | 8.100 | 1.76182 | 26.52 |
| 15 | −13.000 | 1.100 | 1.90366 | 31.31 |
| 16 | 33.721 | 4.731 |  |  |
| 17 | −141.896 | 2.000 | 1.84666 | 23.78 |
| 18 | −35.107 | 0.000 |  |  |
| STO | Infinity | 8.500 |  |  |
| 20 | 591.882 | 1.200 | 1.83400 | 37.16 |
| 21 | 24.868 | 4.119 | 1.68893 | 31.07 |
| 22 | −81.476 | variable spacing |  |  |
| 23 | 49.060 | 7.814 | 1.48749 | 70.24 |
| 24 | −200.026 | variable spacing |  |  |
| 25 | −35.027 | 2.000 | 1.80518 | 25.42 |
| 26 | −83.099 | variable spacing |  |  |
| *27 | −33.918 | 3.080 | 1.53116 | 56.04 |
| *28 | 80.282 | 100.297 |  |  |
| *29 | −57.462 | variable spacing |  |  |
| IMG | Infinity |  |  |  |

The following Table 5 lists aspherical coefficients of the lens surfaces of Example 2.

TABLE 5 aspherical coefficient

|  | K | A04 | A06 | A08 | A10 | A12 | A14 |
|---|---|---|---|---|---|---|---|
| 12 | 1.4552 | −3.7373E−05 | 5.0779E−09 | 5.0980E−10 | −9.2415E−13 | 0.0000E+00 | 0.0000E+00 |
| 13 | −1.0000 | −5.4149E−07 | −4.3725E−08 | 6.8720E−10 | −1.8348E−12 | 0.0000E+00 | 0.0000E+00 |
| 27 | −7.2727 | −3.3388E−06 | 4.6930E−08 | −8.5733E−11 | 7.7697E−14 | −2.6557E−17 | 0.0000E+00 |
| 28 | 0.0000 | −1.4420E−05 | 2.8803E−08 | −4.6804E−11 | 5.9059E−14 | −4.8230E−17 | 2.1287E−20 |
| 29 | −1.4486 | −4.1373E−07 | 5.1283E−11 | −3.4557E−14 | 8.4223E−18 | −1.0922E−21 | 4.5356E−26 |

The following Table 6 lists values of variable spacing 22, 24, 26, and 29 of Table 4 in the projection magnification of 125 times magnification, the projection magnification of 101 times magnification, and the projection magnification of 169 times magnification.

TABLE 6

| variable spacing | | | |
|---|---|---|---|
|  | 125x | 101x | 169x |
| 22 | 22.901 | 22.108 | 23.764 |
| 24 | 7.775 | 7.606 | 7.946 |
| 26 | 12.297 | 13.260 | 11.264 |
| 29 | −501.000 | −409.553 | −663.904 |

Figure 9:
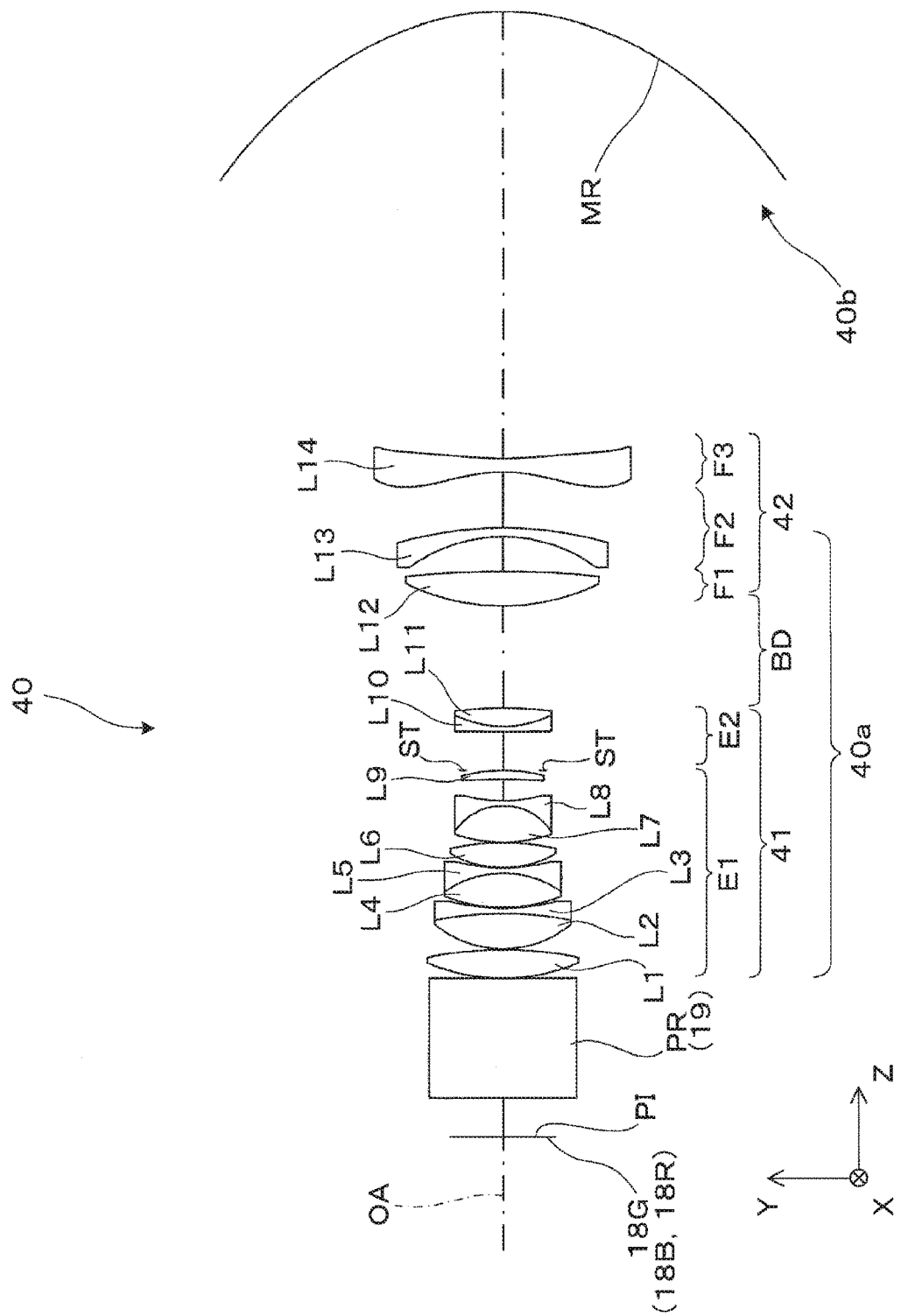
FIG. 9 is a diagram illustrating a configuration of a projection optical system of Example 2.

FIG. 9 is a cross-sectional view of the projection optical system 40 of Example 2. In Example 2, the first optical group 40a is constituted with fourteen lenses from the lens L1 (first lens) to the lens L14 (fourteenth lens) counting from the reduction side and the first optical group 40a can be divided into the 1-1 lens group 41 having positive power and located to the reduction side and the 1-2 lens group 42 having weak negative power compared to the 1-1 lens group 41 and located to the enlargement side bordering the widest air spacing BD. The second optical group 40b is constituted with a single concave aspherical mirror MR. In FIG. 9, the lens L12, the mirror MR, and the like are illustrated as it is without being cut, but in the actual optical system, at least the mirror MR may have a shape in which a portion thereof is cut from a circular shape and another optical system may also have a shape in which a portion thereof is cut from a circular shape.

In FIG. 9, the projection optical system 40 expands and projects an image on the panel surface PI with magnification according to a distance to the screen. That is, the projection optical system 40 includes fourteen lenses L1 to L14 of lenses L1 to L9 constituting the lens group E1 of the 1-1 lens group 41, lenses L10 and L11 constituting the lens group E2, the lens L12 constituting the lens F1 of the 1-2 lens group 42, the lens L13 constituting the lens F2, and the lens L14 constituting the lens F3, in order from the reduction side. For example, the projection position is changed (projection distance is changed) to thereby varying of power is performed as in the case where it is changed from the wall surface projection to the floor surface projection. The lenses F1 and F2 are respectively moved while the 1-1 lens group 41 and the lens F3 among the lenses F1 to F3 constituting the 1-2 lens group 42 are fixed as they are at the time of focusing accompanying the magnification change. That is, in the 1-2 lens group 42, when varying power, two lenses F1 and F2 among three lenses of the lenses F1, F2, and F3 are moved independently of each other when varying power so as to perform focusing.

When details of the lenses L1 to L14 are described, the lens L1 which is a first lens is a biconvex positive lens, the lens L2 which is a second lens is the biconvex positive lens, the lens L3 which is a third lens is a biconcave negative lens, the second lens and the third lens are the cemented lens, the lens L4 which is a fourth lens is the biconvex positive lens, the lens L5 which is a fifth lens is the biconcave negative lens, the fourth lens and the fifth lens are the cemented lens, the lens L6 which is a sixth lens is the biconvex positive lens of which both surfaces are formed by aspherical surface, the lens L7 which is a seventh lens is the biconvex positive lens, the lens L8 which is an eighth lens is the biconcave negative lens, the seventh lens and the eighth lens are the cemented lens, the lens L9 which is a ninth lens is a positive meniscus lens having a convex surface on the enlargement side, the lens L10 which is a tenth lens and located at the rear stage of the aperture diaphragm ST is a negative meniscus lens having a convex surface on the reduction side, the lens L11 which is an eleventh lens is the biconvex positive lens, and the tenth lens and the eleventh lens are the cemented lens. The lens L12 which is a twelfth lens is the biconvex positive lens (that is, a positive lens having a convex surface on at least reduction side), the lens L13 which is a thirteenth lens is a negative meniscus lens having a convex surface on the enlargement side, and the lens L14 which is a fourteenth lens is a negative lens of which both surfaces are formed by aspherical surfaces and which has a biconcave shape in the vicinity of the optical axis. Among the lenses, the lens L14 is a lens molded from resin. The second optical group 40*b* is constituted with a single concave aspherical mirror.

Figure 10A:
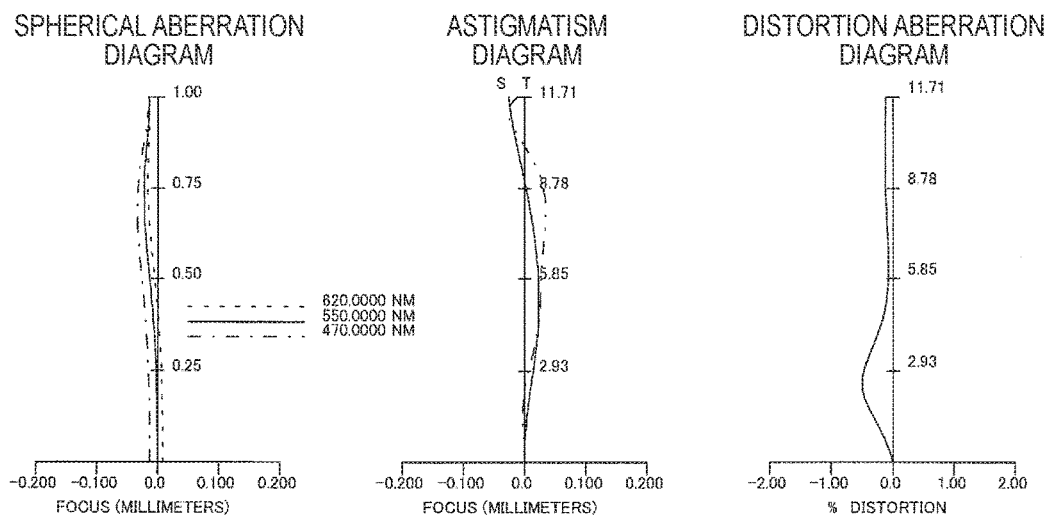
FIGS. 10(A) to 10(C) are reduction side aberration diagrams of the projection optical system of Example 2.
Figure 10B:
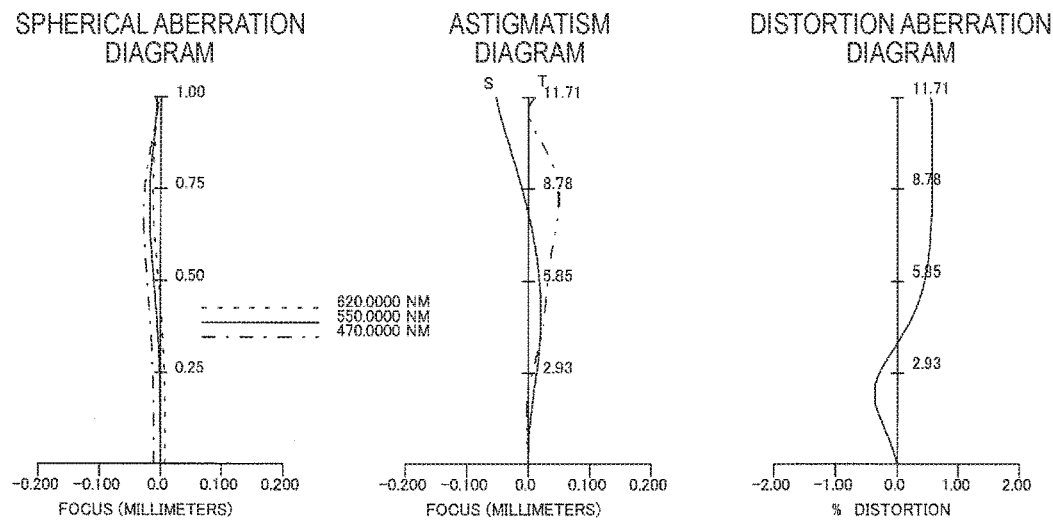
Figure 10C:
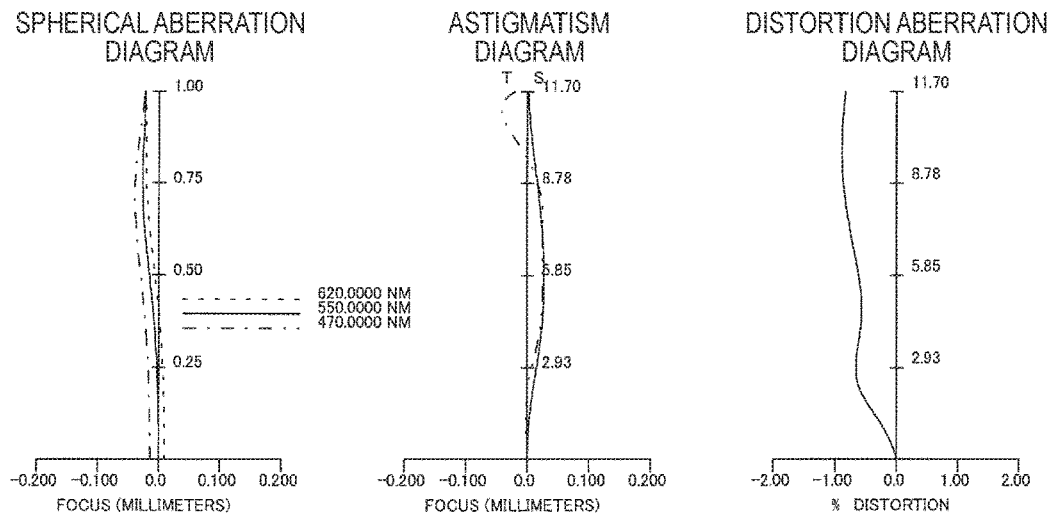
Figure 11A:
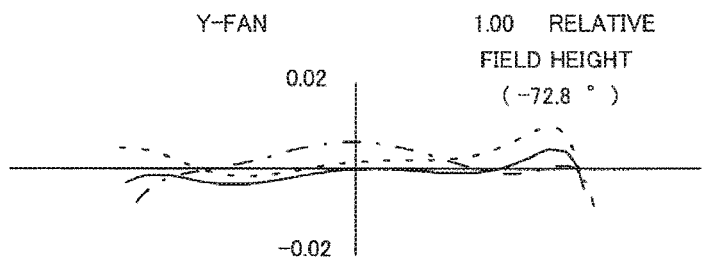
FIGS. 11(A) to 11(E) are lateral aberration diagrams of the projection optical system corresponding to FIG. 10(A).
Figure 11A:
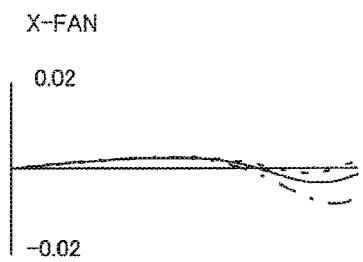
Figure 11B:
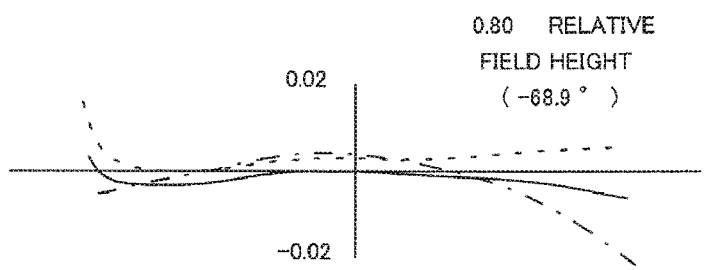
Figure 11B:
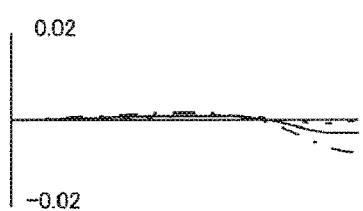
Figure 11C:
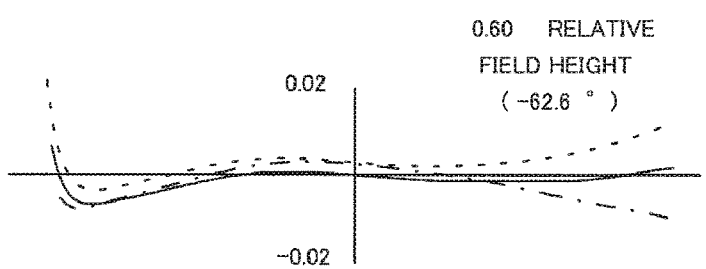
Figure 11C:
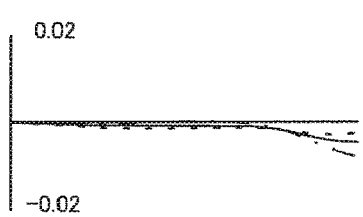
Figure 11D:
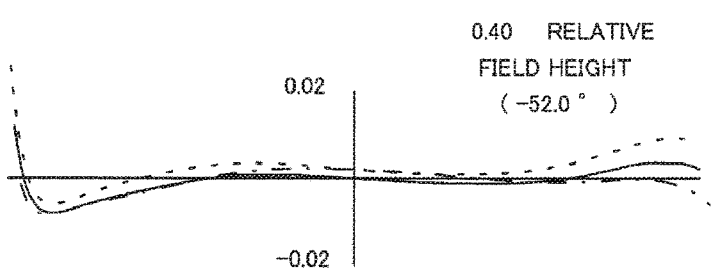
Figure 11D:
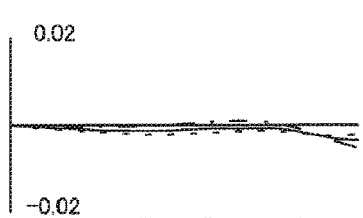
Figure 11E:
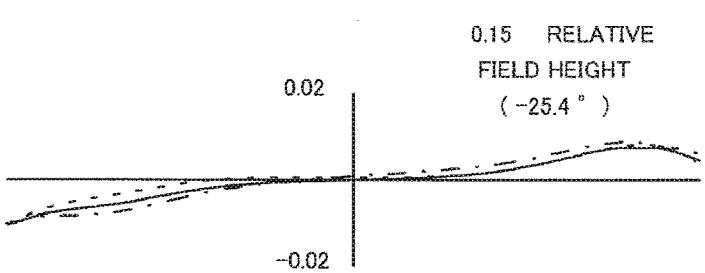
Figure 11E:
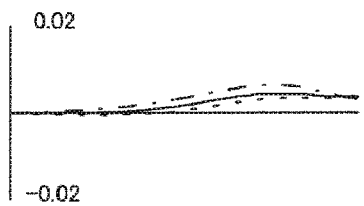
Figure 12A:
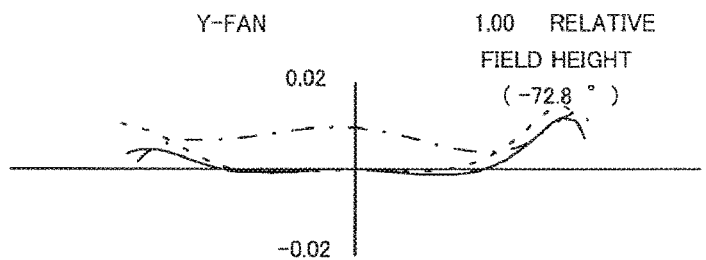
FIGS. 12(A) to 12(E) are lateral aberration diagrams of the projection optical system corresponding to FIG. 10(B).
Figure 12A:
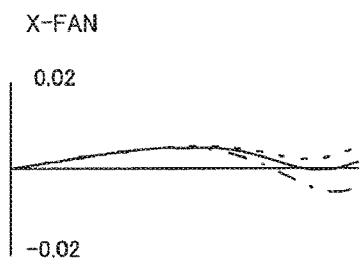
Figure 12B:
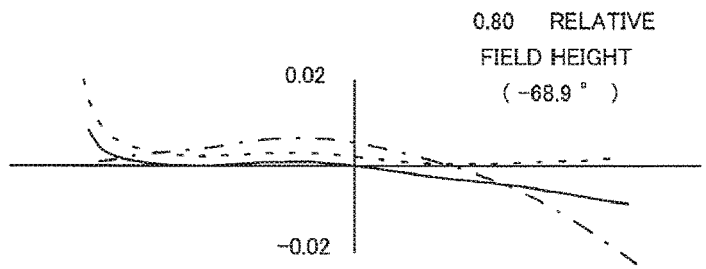
Figure 12B:
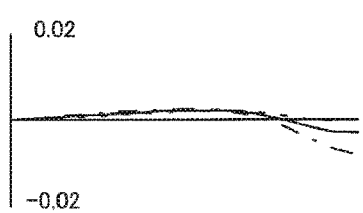
Figure 12C:
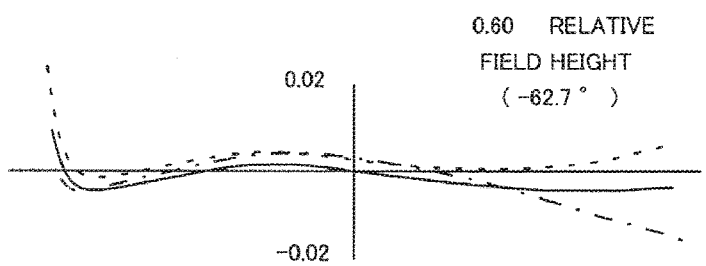
Figure 12C:
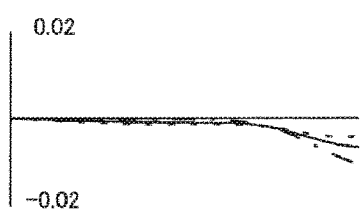
Figure 12D:
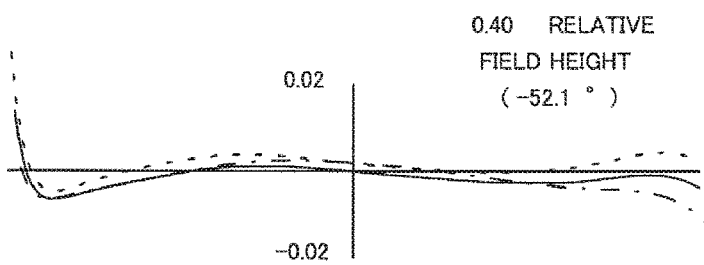
Figure 12D:
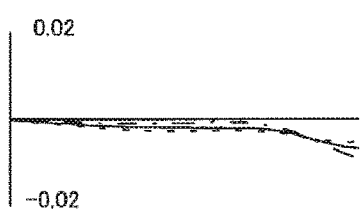
Figure 12E:
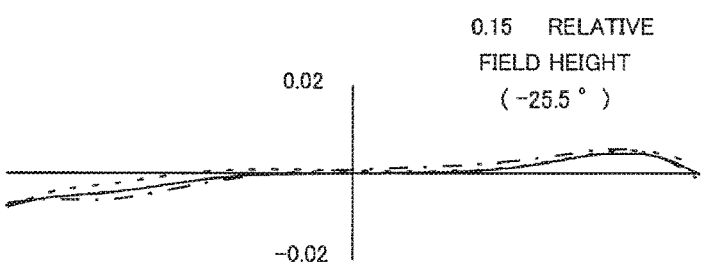
Figure 12E:
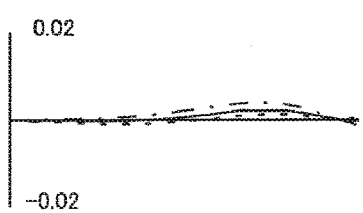
Figure 13A:
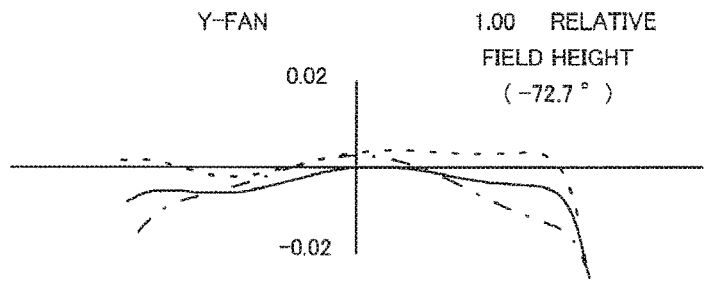
FIGS. 13(A) to 13(E) are lateral aberration diagrams of the projection optical system corresponding to FIG. 10(C).
Figure 13A:
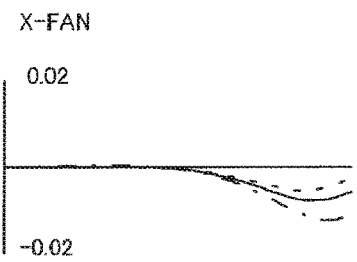
Figure 13B:
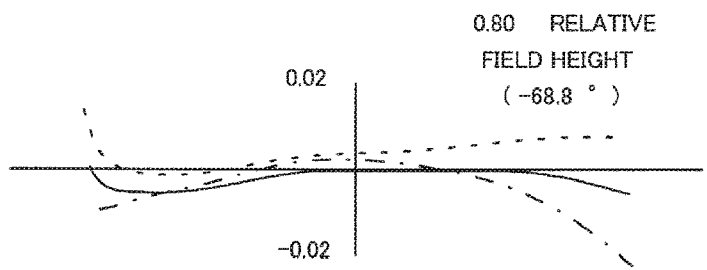
Figure 13B:
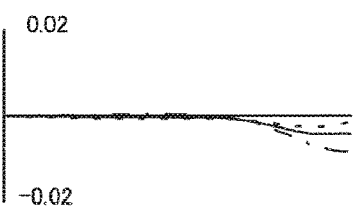
Figure 13C:
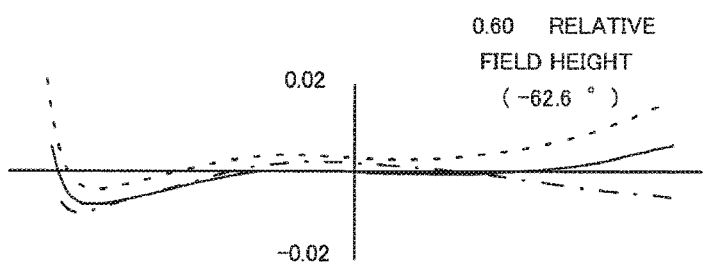
Figure 13C:
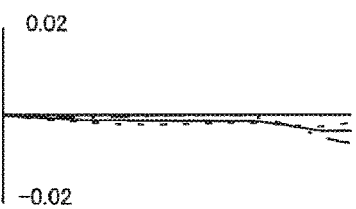
Figure 13D:
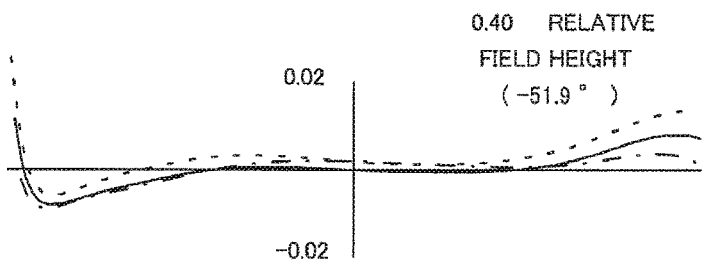
Figure 13D:
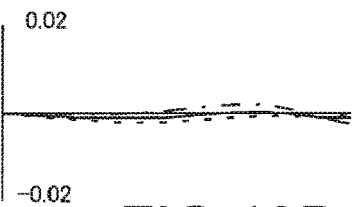
Figure 13E:
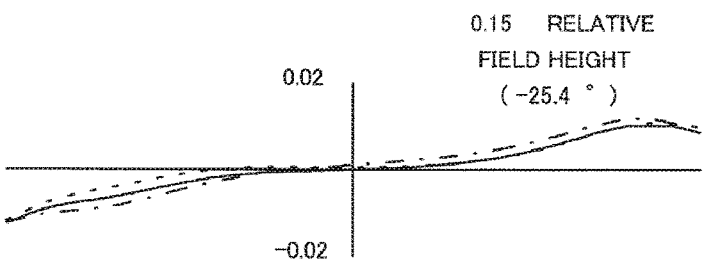
Figure 13E:
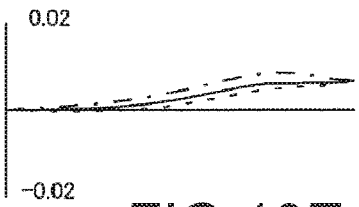

FIG. 10(A) is a reduction side aberration (spherical aberration, astigmatism, distortion aberration) diagram of the projection optical system when projection magnification is 125 times magnification, FIG. 10(B) is a reduction side aberration diagram of the projection optical system when projection magnification is 100 times magnification, and FIG. 10(C) is a reduction side aberration diagram of the projection optical system when projection magnification is 169 times magnification. FIGS. 11(A) to 11(E) are lateral aberration diagrams of the projection optical system corresponding to FIG. 10(A). FIGS. 11(A) to 11(E) represent lateral aberrations in the image heights of 100%, 80%, 60%, 40%, and 15%, respectively. FIG. 11(A) corresponds to a case of the maximum viewing angle. Similarly, FIGS. 12(A) to 12(E) are lateral aberration diagrams of the projection optical system corresponding to FIG. 10(B) and FIGS. 13(A) to 13(E) are lateral aberration diagrams of the projection optical system corresponding to FIG. 10(C).

Example 3

Data of the lens surfaces of Example 3 is listed in the following Table 7. In particular, in the present example, the negative lenses (lenses L6 and L9) having the aspherical shape on at least one surface thereof are arranged in the 1-1 lens group 41 so that increase of the number of lenses is suppressed and miniaturization of a device is achieved.

TABLE 7

| f 3.741 ω 72.7° NA 0.278 | | | | |
|---|---|---|---|---|
| | R | D | Nd | Vd |
| OBJ | Infinity | 8.700 | | |
| 1 | Infinity | 26.840 | 1.51633 | 64.14 |
| 2 | Infinity | 0.000 | | |
| 3 | 47.695 | 7.461 | 1.61800 | 63.39 |
| 4 | −59.921 | 0.200 | | |
| 5 | 25.323 | 7.957 | 1.49700 | 81.54 |
| 6 | −99.197 | 1.200 | 1.80518 | 25.42 |
| 7 | 33.769 | 0.200 | | |
| 8 | 18.826 | 10.100 | 1.48749 | 70.24 |
| 9 | −20.890 | 1.200 | 1.83400 | 37.16 |
| 10 | 28.304 | 0.200 | | |
| *11 | 15.298 | 4.464 | 1.51633 | 64.06 |
| *12 | 32.543 | 1.036 | | |
| 13 | 21.116 | 7.957 | 1.76182 | 26.52 |
| 14 | −13.000 | 1.100 | 1.90366 | 31.31 |
| 15 | −91.275 | 0.200 | | |
| *16 | 95.123 | 1.400 | 1.79952 | 42.22 |
| *17 | 33.002 | 1.325 | | |
| STO | Infinity | 11.700 | | |
| 19 | 228.052 | 2.200 | 1.68893 | 31.07 |
| 20 | −120.975 | variable spacing | | |
| 21 | 41.911 | 7.308 | 1.59522 | 67.73 |
| 22 | 389.552 | variable spacing | | |
| 23 | −32.143 | 2.000 | 1.80518 | 25.42 |
| 24 | −50.558 | variable spacing | | |
| *25 | −43.069 | 3.080 | 1.53116 | 56.04 |
| *26 | 53.557 | variable spacing | | |
| *27 | −51.941 | variable spacing | | |
| IMG | Infinity | | | |

The following Table 8 lists aspherical coefficients of the lens surfaces of Example 3.

TABLE 8

| | aspherical coefficient | | | | | | |
|---|---|---|---|---|---|---|---|
| | K | A04 | A06 | A08 | A10 | A12 | A14 |
| 11 | 0.3636 | −6.0523E−05 | −2.0810E−07 | 3.7326E−10 | 1.7724E−12 | 0.0000E+00 | 0.0000E+00 |
| 12 | −1.0000 | −1.5597E−05 | −6.3727E−07 | 6.7222E−10 | 1.0035E−11 | 0.0000E+00 | 0.0000E+00 |
| 16 | 0.0000 | 4.3352E−05 | −2.9757E−06 | 1.8550E−08 | 0.0000E+00 | 0.0000E+00 | 0.0000E+00 |
| 17 | 0.0000 | 9.9190E−05 | −2.7153E−06 | 1.9674E−08 | 0.0000E+00 | 0.0000E+00 | 0.0000E+00 |
| 25 | −12.4724 | −1.0026E−06 | 4.3380E−08 | −8.0926E−11 | 8.2590E−14 | −3.2998E−17 | 0.0000E+00 |
| 26 | 0.0000 | −1.5565E−05 | 3.1830E−08 | −4.2046E−11 | 4.6170E−14 | −3.2438E−17 | 1.9494E−20 |
| 27 | −1.77476 | −6.65E−07 | 6.02E−11 | −2.82E−14 | 6.36E−18 | −9.52E−22 | 4.80E−26 |

The following Table 9 lists values of variable spacing 20, 22, 24, 26, and 27 of Table 7 in the projection magnification of 125 times magnification, the projection magnification of 101 times magnification, and the projection magnification of 169 times magnification.

TABLE 9

| | variable spacing | | |
|---|---|---|---|
| | 125x | 101x | 169x |
| 20 | 18.449 | 17.497 | 19.543 |
| 22 | 8.753 | 8.232 | 9.325 |
| 24 | 6.887 | 8.206 | 5.404 |
| 26 | 98.083 | 98.236 | 97.901 |
| 27 | −501.000 | −406.898 | −669.193 |

Figure 14:
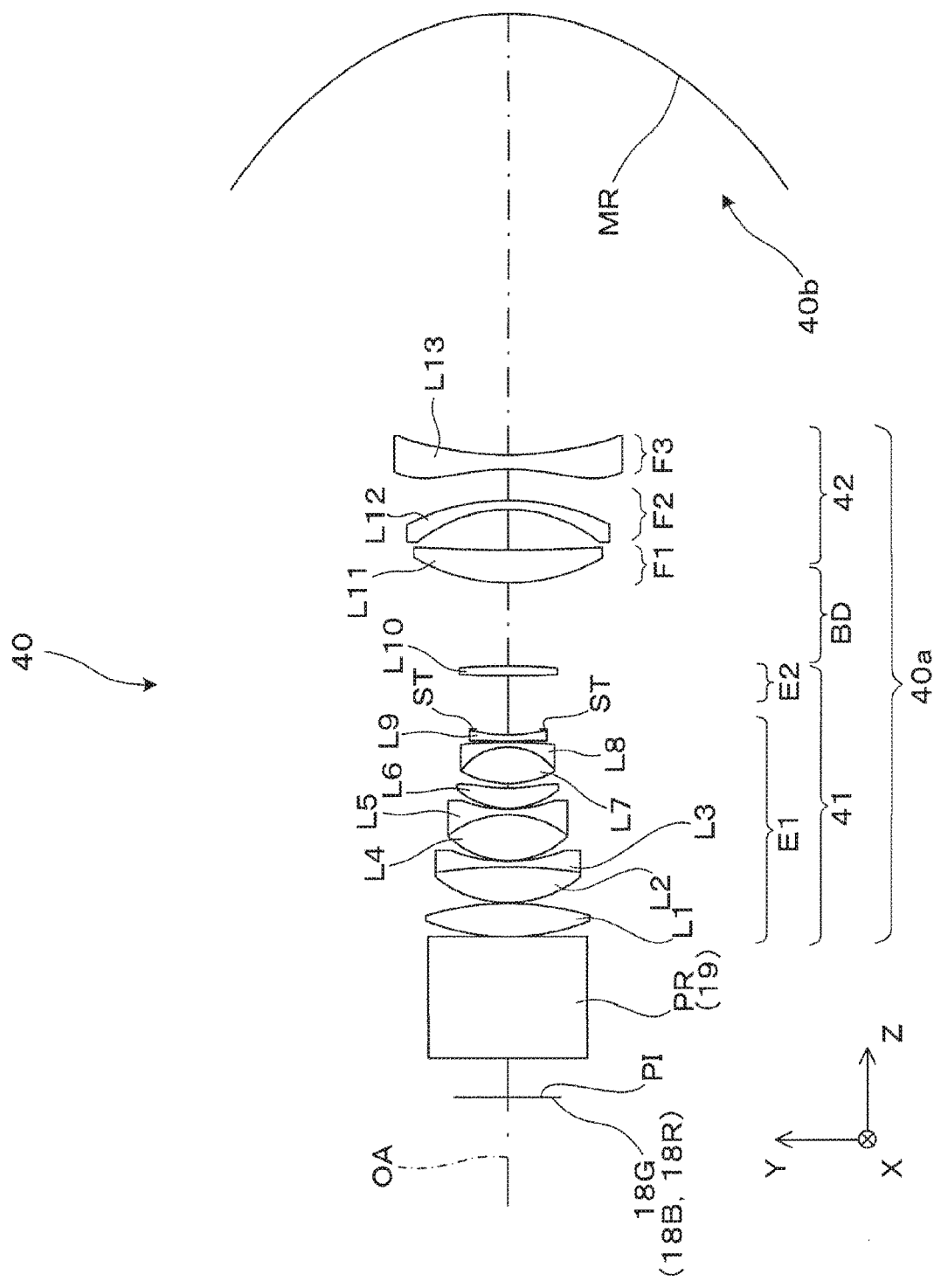
FIG. 14 is a diagram illustrating a configuration of a projection optical system of Example 3.

FIG. 14 is a cross-sectional view of the projection optical system 40 of Example 3. In Example 3, the first optical group 40a is constituted with thirteen lenses from the lens L1 (first lens) to the lens L13 (thirteenth lens) counting from the reduction side and the first optical group 40a can be divided into the 1-1 lens group 41 having positive power and located to the reduction side and the 1-2 lens group 42 having weak negative power compared to the 1-1 lens group 41 and located to the enlargement side bordering the widest air spacing BD. The second optical group 40b is constituted with a single concave aspherical mirror MR. In FIG. 14, the lens L13, the mirror MR, and the like are illustrated as it is without being cut, but in the actual optical system, at least the mirror MR may have a shape in which a portion thereof is cut from a circular shape and another optical system may also have a shape in which a portion thereof is cut from a circular shape.

In FIG. 14, the projection optical system 40 expands and projects an image on the panel surface PI with magnification according to a distance to the screen. That is, the projection optical system 40 includes thirteen lenses L1 to L13 of lenses L1 to L9 constituting the lens group E1, the lens L10 constituting the lens group E2 of the 1-1 lens group 41, the lens L11 constituting the lens F1, the lens L12 constituting the lens F2, and the lens L13 constituting the lens F3 of the 1-2 lens group 42, in order from the reduction side. For example, the projection position is changed (projection distance is changed) to thereby perform varying of power as in the case where it is changed from the wall surface projection to the floor surface projection. The lenses F1 to F3 are respectively moved while the 1-1 lens group 41 is fixed as it is, at the time of focusing accompanying the magnification change. That is, in the 1-2 lens group 42, when varying power, three lenses of the lenses F1, F2, and F3 are moved independently so as to perform focusing.

When details of the lenses L1 to L13 are described, the lens L1 which is a first lens is a biconvex positive lens, the lens L2 which is a second lens is the biconvex positive lens, the lens L3 which is a third lens is a biconcave negative lens, the second lens and the third lens are the cemented lens, the lens L4 which is a fourth lens is the biconvex positive lens, the lens L5 which is a fifth lens is the biconcave negative lens, the fourth lens and the fifth lens are the cemented lens, the lens L6 which is a sixth lens is the positive meniscus lens of which both surfaces are formed by aspherical surface and having a convex surface on the reduction side, the lens L7 which is a seventh lens is the biconvex positive lens, the lens L8 which is an eighth lens is the negative meniscus lens having a convex surface on the enlargement side, the seventh lens and the eighth lens are the cemented lens, the lens L9 which is a ninth lens is the negative meniscus lens of which both surfaces are formed by aspherical surface and having a convex surface on the enlargement side, the lens L10 which is the tenth lens and located at the rear stage of the aperture diaphragm ST is the biconvex positive lens. The lens L11 which is an eleventh lens is the positive meniscus lens having a convex surface on the reduction side, the lens L12 which is a twelfth lens is the negative meniscus lens having a convex surface on the enlargement side, and the lens L13 which is a thirteenth lens is the negative lens of which both surfaces are formed by aspherical surfaces and which has a biconcave shape in the vicinity of the optical axis. Among the lenses, the lens L14 is a lens molded from resin. The second optical group 40b is constituted with a single concave aspherical mirror as previously described.

In the present example, in the 1-1 lens group 41, the lenses (lenses L6 and L9) having the aspherical surface of the concave shape are introduced so that the number of lenses is suppressed, the entire length of lenses, or the mirror radius of the second optical group 40b is made small. Specifically, for example, compared to Examples 1 and 2 described above, the number of lenses is decreased by one lens and miniaturization of the extent of −5% in the entire length of lenses and the extent of −8% in the mirror radius is realized.

Figure 15A:
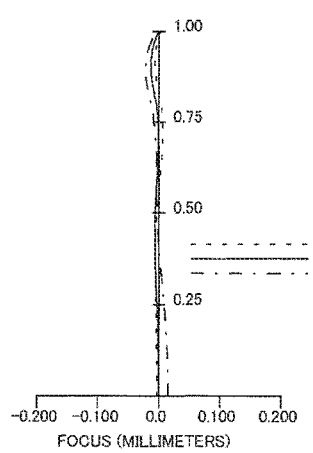
FIGS. 15(A) to 15(C) are reduction side aberration diagrams of the projection optical system of Example 3.
Figure 15A:
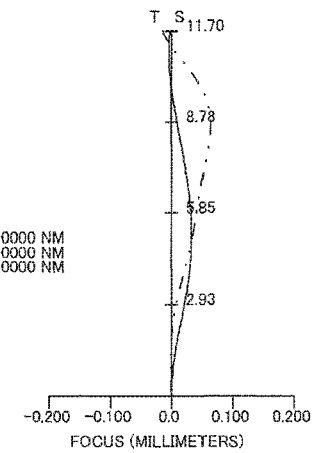
Figure 15A:
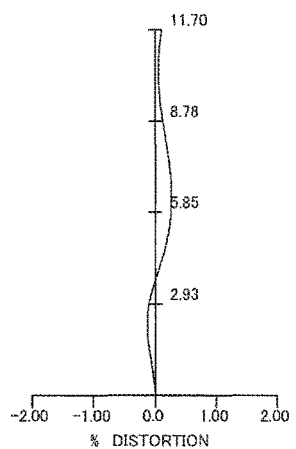
Figure 15B:
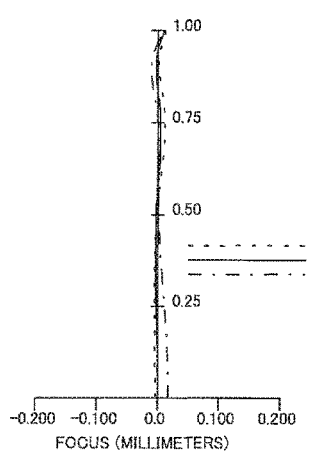
Figure 15B:
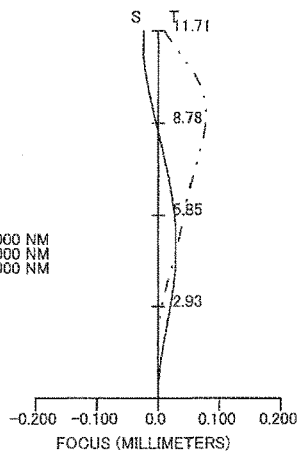
Figure 15B:
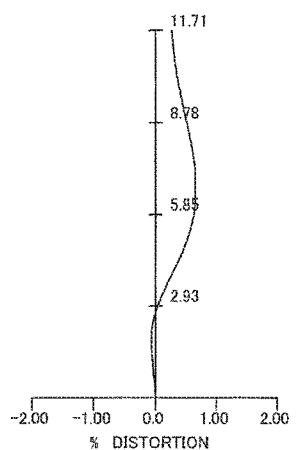
Figure 15C:
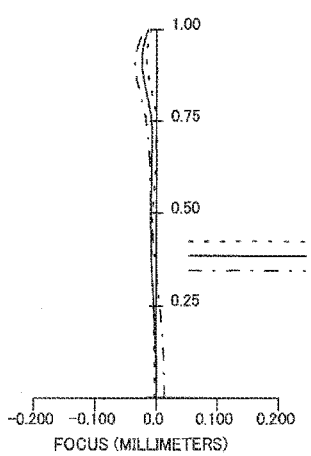
Figure 15C:
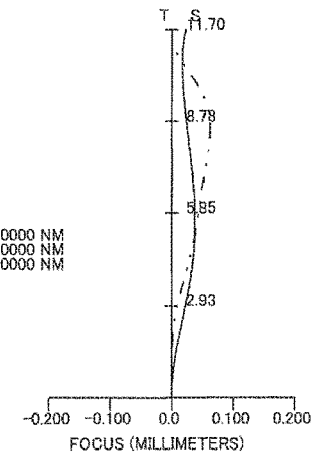
Figure 15C:
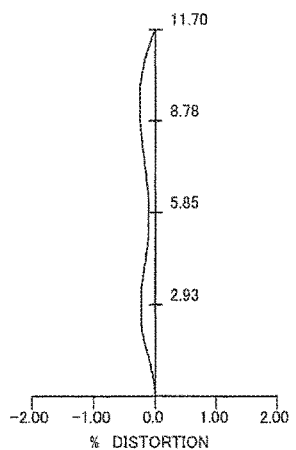
Figure 16A:
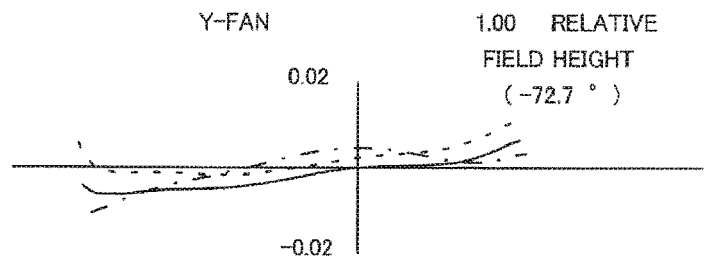
FIGS. 16(A) to 16(E) are lateral aberration diagrams of the projection optical system corresponding to FIG. 15(A).
Figure 16A:
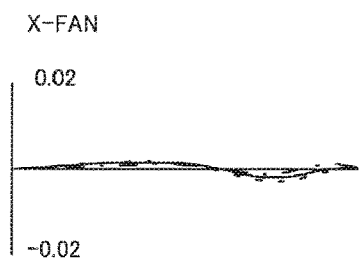
Figure 16B:
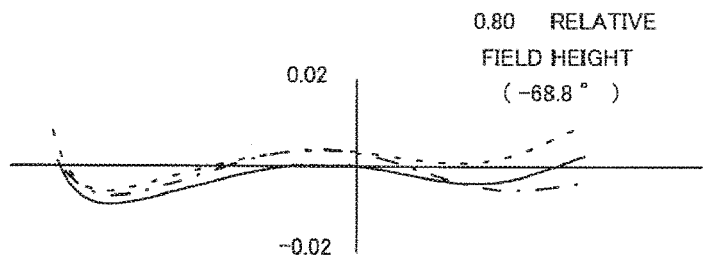
Figure 16B:
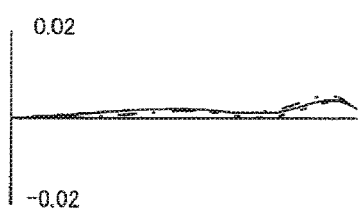
Figure 16C:
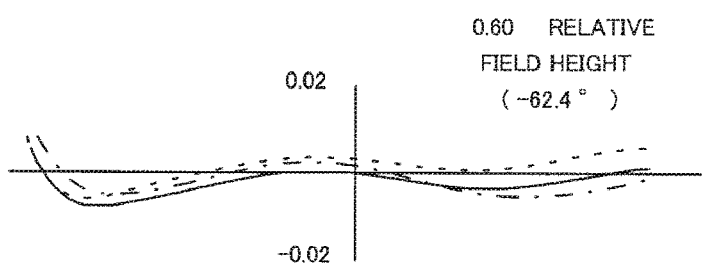
Figure 16C:
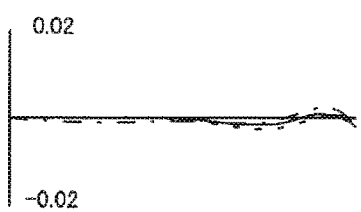
Figure 16D:
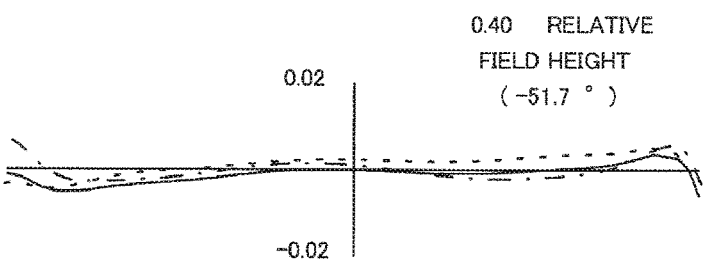
Figure 16D:
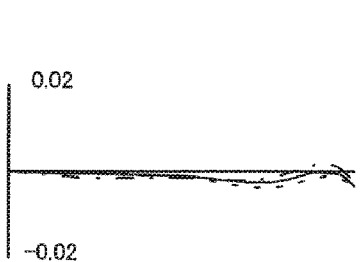
Figure 16E:
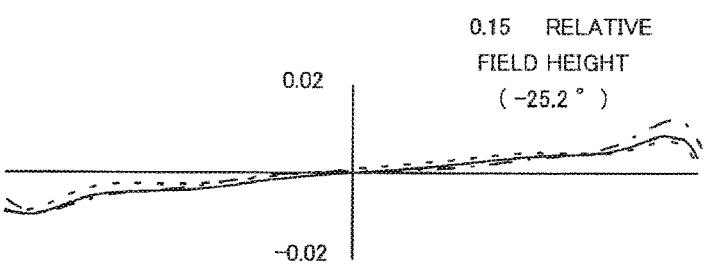
Figure 16E:
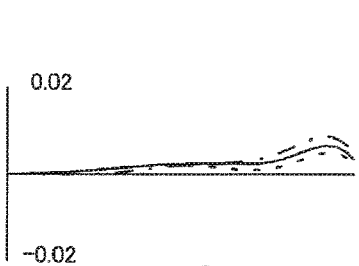
Figure 17A:
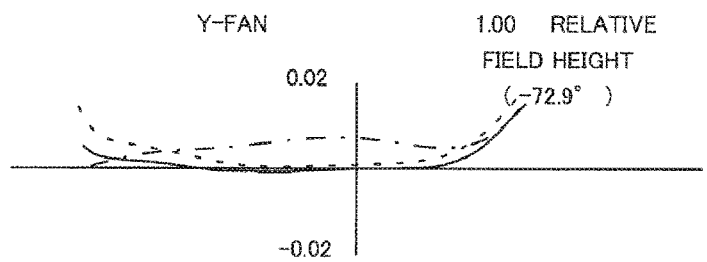
FIGS. 17(A) to 17(E) are lateral aberration diagrams of the projection optical system corresponding to FIG. 15(B).
Figure 17A:
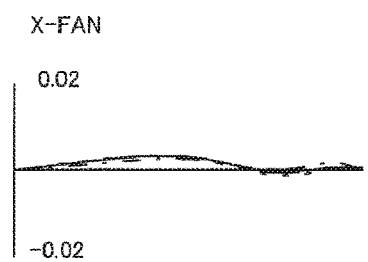
Figure 17B:
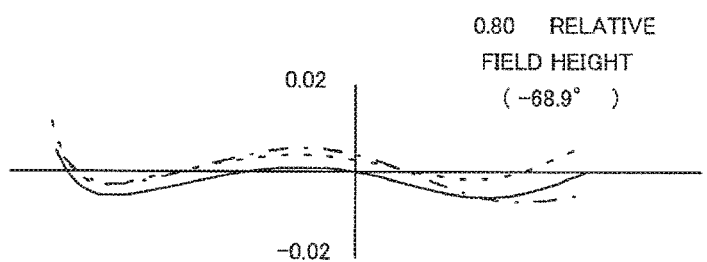
Figure 17B:
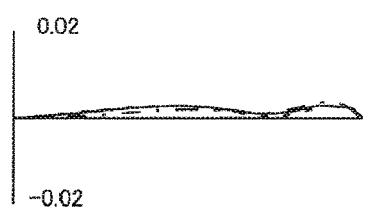
Figure 17C:
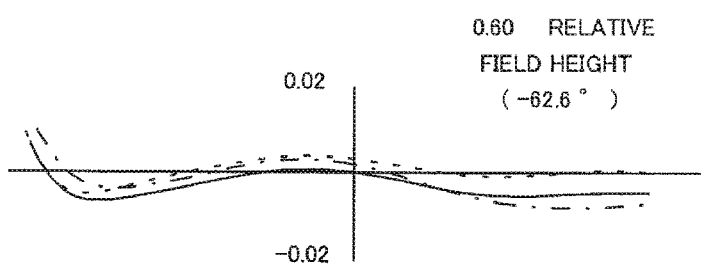
Figure 17C:
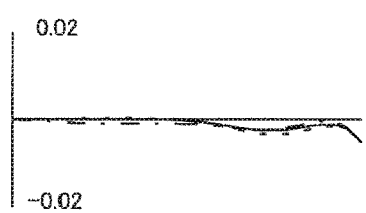
Figure 17D:
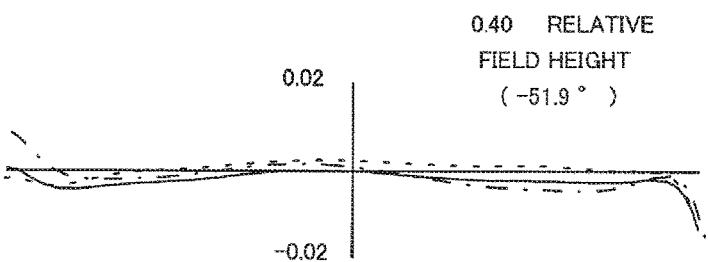
Figure 17D:
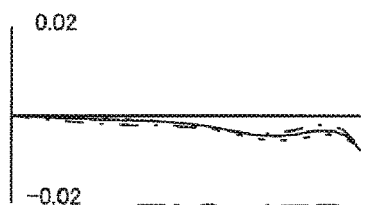
Figure 17E:
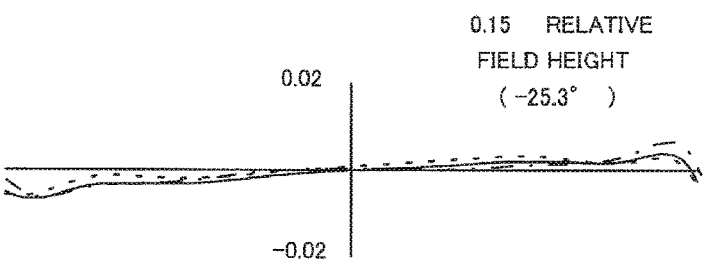
Figure 17E:
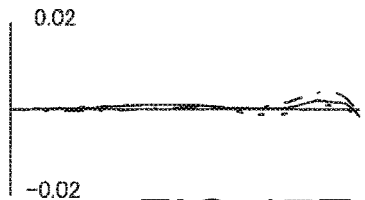
Figure 18A:
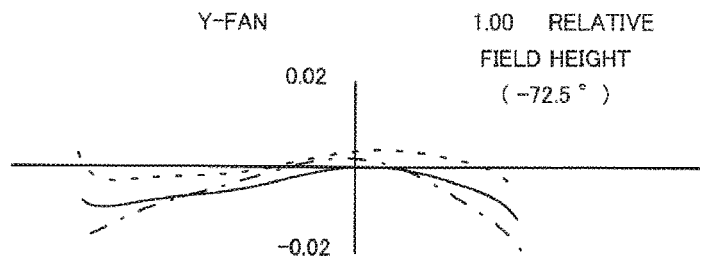
FIGS. 18(A) to 18(E) are lateral aberration diagrams of the projection optical system corresponding to FIG. 15(C).
Figure 18A:
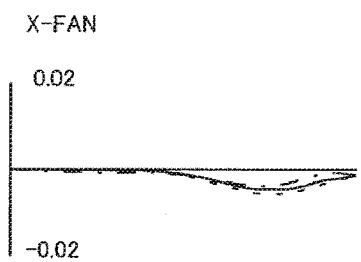
Figure 18B:
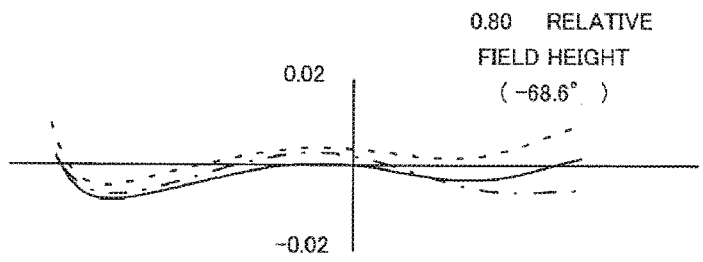
Figure 18B:
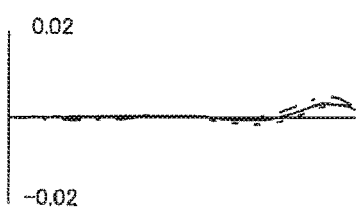
Figure 18C:
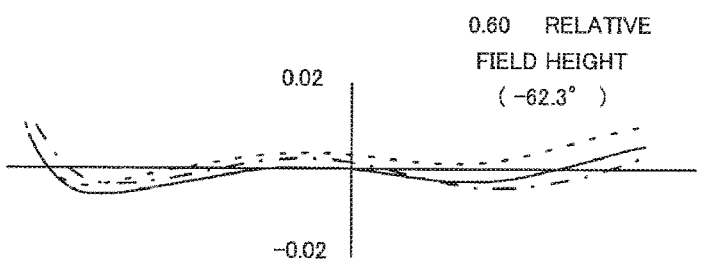
Figure 18C:
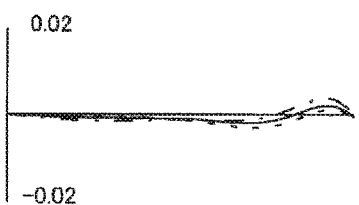
Figure 18D:
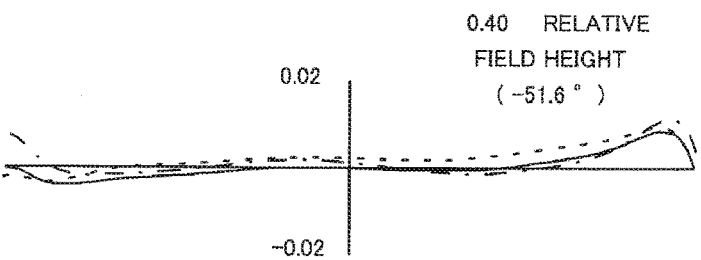
Figure 18D:
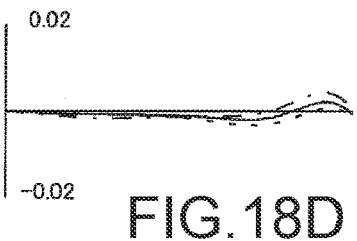
Figure 18E:
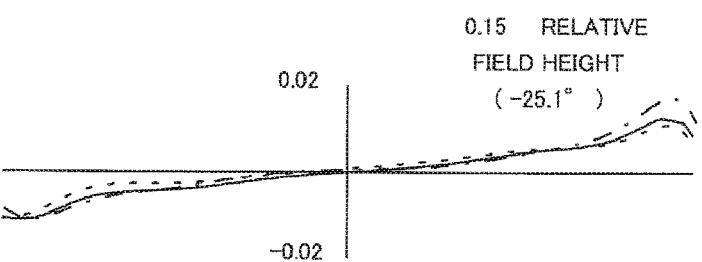
Figure 18E:
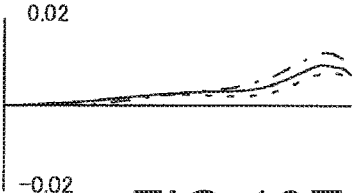

FIG. 15(A) is a reduction side aberration (spherical aberration, astigmatism, distortion aberration) diagram of the projection optical system when projection magnification is 125 times magnification, FIG. 15(B) is a reduction side aberration diagram of the projection optical system when projection magnification is 101 times magnification, and FIG. 15(C) is a reduction side aberration diagram of the projection optical system when projection magnification is 169 times magnification. FIGS. 16(A) to 16(E) are lateral aberration diagrams of the projection optical system corresponding to FIG. 15(A). FIGS. 16(A) to 16(E) represent lateral aberrations in the image heights of 100%, 80%, 60%, 40%, and 15%, respectively. FIG. 16(A) corresponds to a case of the maximum viewing angle. Similarly, FIGS. 17(A) to 17(E) are lateral aberration diagrams of the projection optical system corresponding to FIG. 15(B) and FIGS. 18(A) to 18(E) are lateral aberration diagrams of the projection optical system corresponding to FIG. 15(C).

Example 4

Data of the lens surfaces of Example 4 is listed in the following Table 10. In particular, in the present example, the negative lens (lens L9) having an aspherical shape on at least one surface thereof is arranged in the vicinity of the aperture diaphragm ST in the 1-1 lens group 41. That is, the negative lens having the aspherical shape on at least one surface thereof is used as the lens (lens L9), among the respective lenses L1 to L13, which is positioned nearest from the aperture diaphragm ST so that brightness with the numerical aperture NA of 0.3 or more (that is, of the extent of the F-number of 1.6) is obtained.

TABLE 10

| f 3.702 ω 72.9° NA 0.313 | | | | |
|---|---|---|---|---|
| | R | D | Nd | Vd |
| OBJ | Infinity | 8.700 | | |
| 1 | Infinity | 26.840 | 1.51633 | 64.14 |
| 2 | Infinity | 0.000 | | |
| 3 | 40.85 | 7.059 | 1.61800 | 63.39 |
| 4 | −94.234 | 0.200 | | |

TABLE 10-continued f 3.702 ω 72.9° NA 0.313

| | R | D | Nd | Vd |
|---|---|---|---|---|
| 5 | 32.165 | 7.172 | 1.49700 | 81.54 |
| 6 | -95.69 | 1.200 | 1.80518 | 25.42 |
| 7 | 67.147 | 0.200 | | |
| 8 | 23.795 | 11.500 | 1.48749 | 70.24 |
| 9 | -18.166 | 1.200 | 1.83400 | 37.16 |
| 10 | 391.997 | 0.100 | | |
| *11 | 29.489 | 5.020 | 1.58913 | 61.15 |
| *12 | -73.538 | 0.100 | | |
| 13 | 117.61 | 6.626 | 1.76182 | 26.52 |
| 14 | -13 | 1.100 | 1.90366 | 31.31 |
| 15 | 37.701 | 2.393 | | |
| 16 | -36.192 | 1.200 | 1.80610 | 40.88 |
| *17 | -129.646 | 0.500 | | |
| STO | Infinity | 2.370 | | |
| 19 | 64.407 | 1.200 | 1.83400 | 37.16 |
| 20 | 22.576 | 5.861 | 1.68893 | 31.07 |
| 21 | -25.412 | variable spacing | | |
| 22 | 55.01 | 7.500 | 1.48749 | 70.24 |
| 23 | -152.86 | 12.859 | | |
| 24 | -29.36 | 2.000 | 1.80518 | 25.42 |
| 25 | -53.839 | variable spacing | | |
| *26 | -33.925 | 3.080 | 1.53116 | 56.04 |
| *27 | 91.042 | variable spacing | | |
| *28 | -56.001 | variable spacing | | |
| IMG | Infinity | | | |

The following Table 11 lists aspherical coefficients of the lens surfaces of Example 4.

TABLE 11

| | aspherical coefficient | | | | | | |
|---|---|---|---|---|---|---|---|
| | K | A04 | A06 | A08 | A10 | A12 | A14 |
| 11 | -1.0598 | -4.2376E-05 | 2.8896E-08 | 5.7752E-10 | 3.0657E-12 | 0.0000E+00 | 0.0000E+00 |
| 12 | -1.0000 | -6.3509E-05 | 4.1609E-08 | 6.7459E-10 | 3.0208E-13 | 0.0000E+00 | 0.0000E+00 |
| 17 | 8.1203 | 3.5595E-05 | -4.1043E-08 | -2.7722E-10 | 0.0000E+00 | 0.0000E+00 | 0.0000E+00 |
| 26 | -6.1895 | 1.3952E-06 | 3.0684E-08 | -6.2666E-11 | 7.2508E-14 | -3.2444E-17 | 0.0000E+00 |
| 27 | 0.0000 | -1.7496E-05 | 3.6163E-08 | -6.7128E-11 | 9.0633E-14 | -6.4769E-17 | 2.3354E-20 |
| 28 | -2.5709 | -9.8518E-07 | 1.7178E-10 | -4.3004E-14 | 7.5901E-18 | -8.8414E-22 | 4.2007E-26 |

The following Table 12 lists values of variable spacing 21, 25, 27, and 28 of Table 10 in the projection magnification of 125 times magnification, the projection magnification of 101 times magnification, and the projection magnification of 169 times magnification.

TABLE 12

| | variable spacing | | |
|---|---|---|---|
| | 125x | 101x | 169x |
| 21 | 24.812 | 24.026 | 25.590 |
| 25 | 4.000 | 4.462 | 3.530 |
| 27 | 115.208 | 115.533 | 114.900 |
| 28 | -501.000 | -408.081 | -666.083 |

Figure 19:
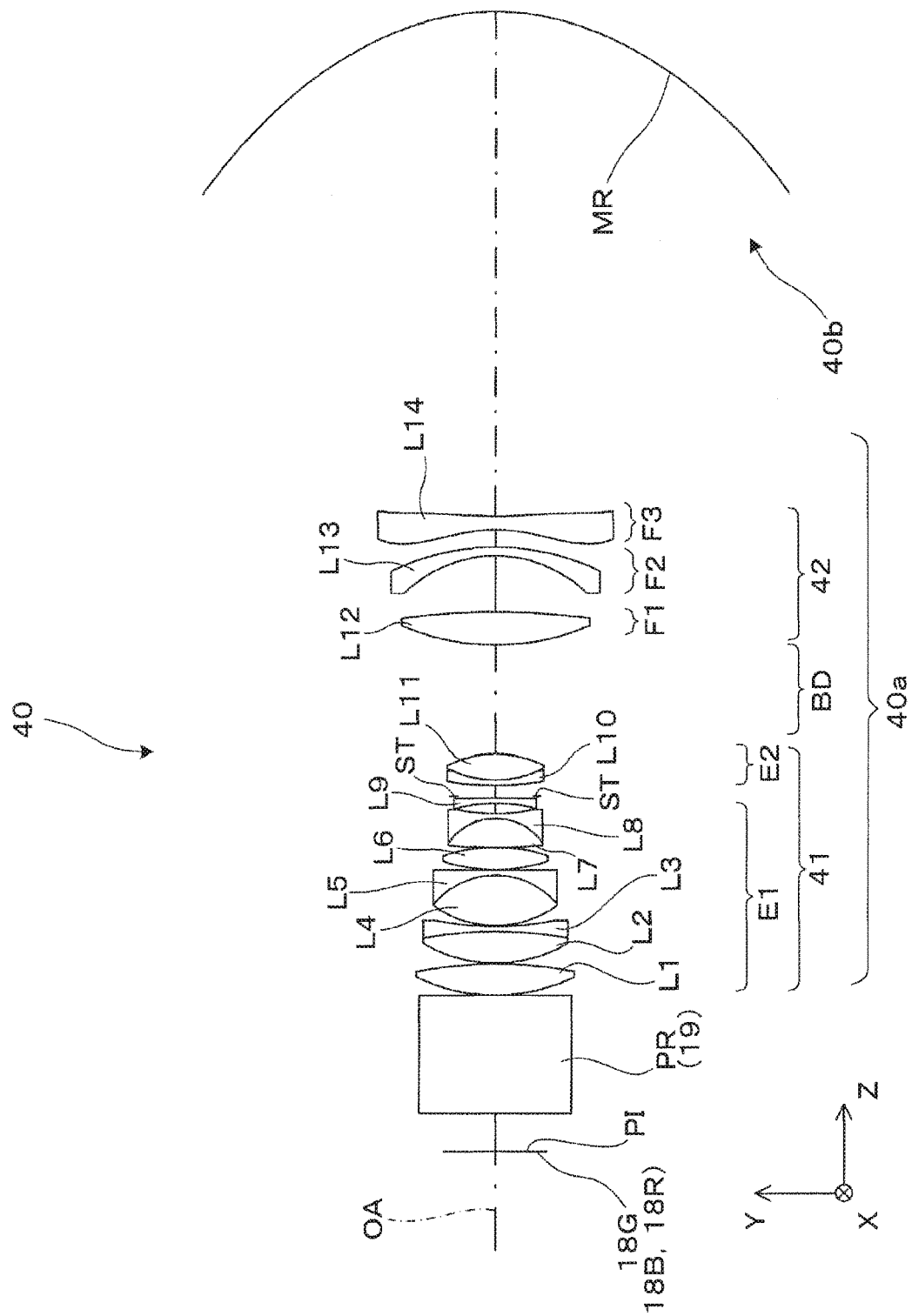
FIG. 19 is a diagram illustrating a configuration of a projection optical system of Example 4.

FIG. 19 is a diagram illustrating a configuration of the projection optical system 40 of Example 4. In Example 4, the first optical group 40a is constituted with fourteen lenses from the lens L1 (first lens) to the lens L14 (fourteenth lens) counting from the reduction side and the first optical group 40a can be divided into the 1-1 lens group 41 having positive power and located to the reduction side and the 1-2 lens group 42 having weak negative power compared to the 1-1 lens group 41 and located to the enlargement side bordering the widest air spacing BD. The second optical group 40b is constituted with a single concave aspherical mirror MR. In FIG. 19, the lens L12, the mirror MR, and the like are illustrated as it is without being cut, but in the actual optical system, at least the mirror MR may have a shape in which a portion thereof is cut from a circular shape and another optical system may also have a shape in which a portion thereof is cut from a circular shape.

In FIG. 19, the projection optical system 40 expands and projects an image on the panel surface PI with magnification according to a distance to the screen. That is, the projection optical system 40 includes fourteen lenses L1 to L14 of lenses L1 to L9 constituting the lens group E1 of the 1-1 lens group 41, lenses L10 and L11 constituting the lens group E2, the lens L12 constituting the lens F1 of the 1-2 lens group 42, the lens L13 constituting the lens F2, and the lens L14 constituting the lens F3, in order from the reduction side. For example, the projection position is changed (projection distance is changed) to thereby varying of power is performed as in the case where it is changed from the wall surface projection to the floor surface projection. The lenses F1 to F3 are respectively moved while the 1-1 lens group 41 is fixed as it is, at the time of focusing accompanying the magnification change. Here, in the 1-2 lens group 42, when varying power, the lenses F1 and F2 are integrally moved and the lens F3 is moved independently of the lenses F1 and F2 so as to perform focusing.

When details of the lenses L1 to L14 are described, among the 1-1 lens group 41, the lens L1 which is a first lens is a biconvex positive lens, the lens L2 which is a second lens is the biconvex positive lens, the lens L3 which is a third lens is a biconcave negative lens, the second lens and the third lens are the cemented lens, the lens L4 which is a fourth lens is the biconvex positive lens, the lens L5 which is a fifth lens is the biconcave negative lens, the fourth lens and the fifth lens are the cemented lens, the lens L6 which is a sixth lens is the biconvex positive lens of which both surfaces are formed by aspherical surface, the lens L7 which is a seventh lens is the biconvex positive lens, the lens L8 which is an eighth lens is the biconcave negative lens, the seventh lens and the eighth lens are the cemented lens, the lens L9 which is a ninth lens is the negative meniscus lens having a convex surface on which the aspherical surface is formed to the enlargement n side, the lens L10 which is a tenth lens and located at the rear stage of the aperture diaphragm ST is the negative meniscus lens having a convex surface on which the aspherical surface is formed to the reduction side, the lens L11 which is an eleventh lens is the biconvex positive lens, and the tenth lens and the eleventh lens are the cemented lens. Among the 1-2 lens group 42, the lens L12 which is a twelfth lens is the biconvex positive lens (that is, positive lens having a convex surface on at least reduction side), the lens L13 which is a thirteenth lens is a negative meniscus lens having a convex surface on the enlargement side, and the lens L14 which is a fourteenth lens is a negative lens of which both surfaces are formed in aspherical surfaces and which has a biconcave shape in the vicinity of the optical axis. Among the lenses, the lens L14 is a lens molded from resin. The second optical group 40b is constituted with a single concave aspherical mirror as described above.

In the present example, the negative lens (lens L9) having an aspherical shape on at least one surface thereof (surface to the enlargement side) is arranged in the vicinity of the aperture diaphragm ST in the 1-1 lens group 41 and accordingly, it is possible to favorably correct image surface curvature and astigmatism characteristic in a wide zooming range and brightness with the numerical aperture NA of greater than or equal to 0.3 (that is, F-number of the extent of 1.6 is obtained) while maintaining capability of obtaining stable performance.

Figure 20A:
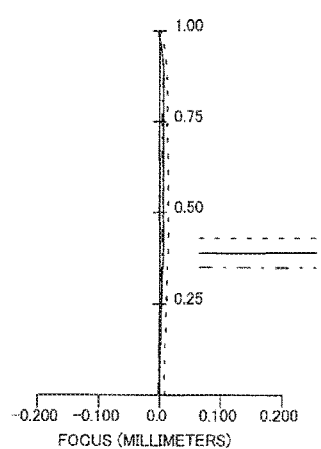
FIGS. 20(A) to 20(C) are reduction side aberration diagrams of the projection optical system of Example 4.
Figure 20A:
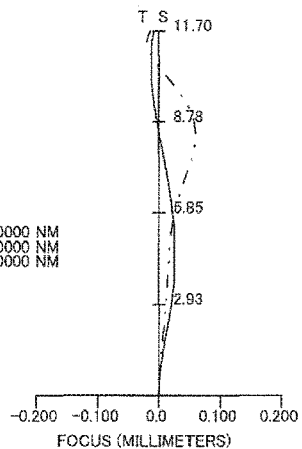
Figure 20A:
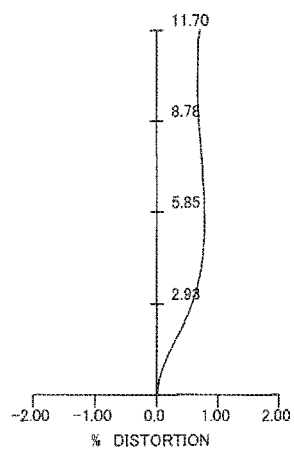
Figure 20B:
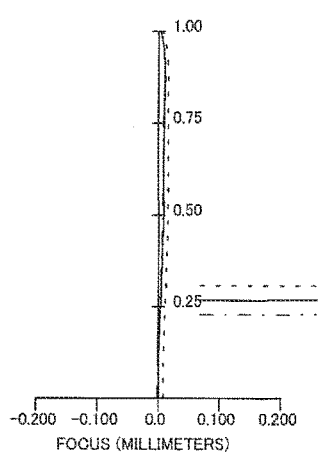
Figure 20B:
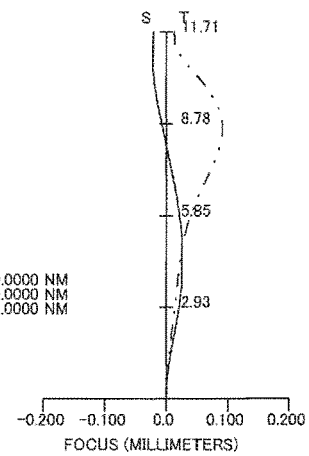
Figure 20B:
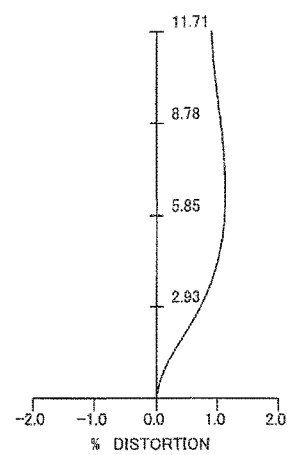
Figure 20C:
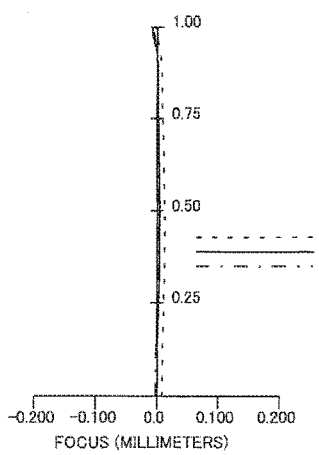
Figure 20C:
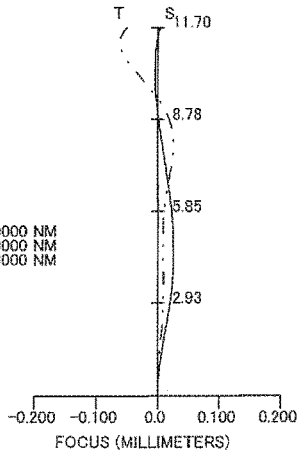
Figure 20C:
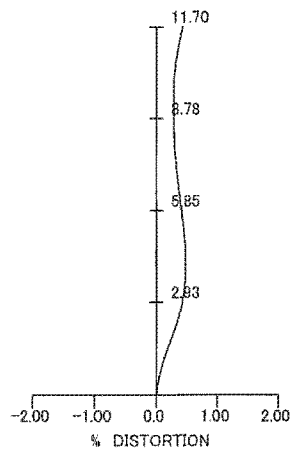
Figure 21A:
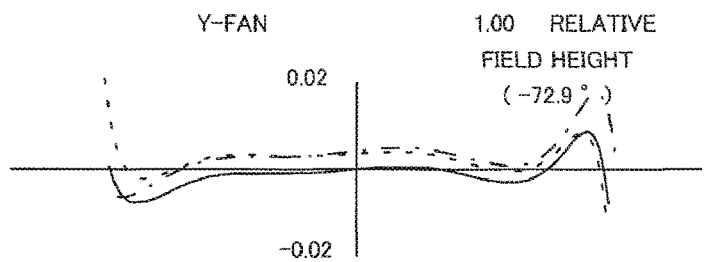
FIGS. 21(A) to 21(E) are lateral aberration diagrams of the projection optical system corresponding to FIG. 20(A).
Figure 21A:
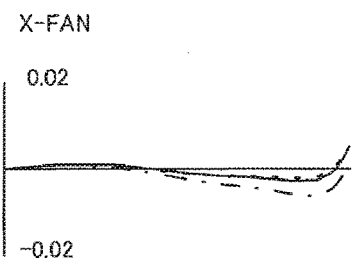
Figure 21B:
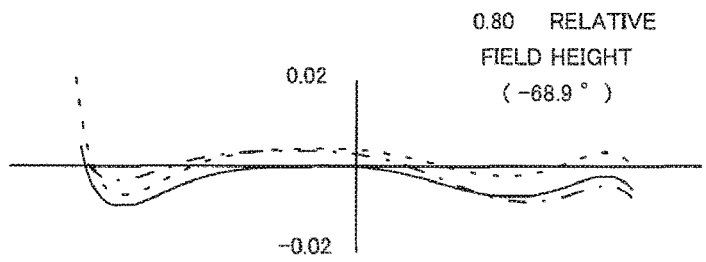
Figure 21B:
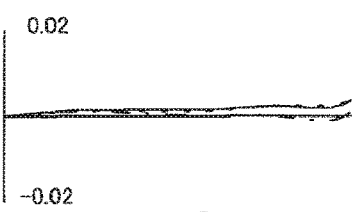
Figure 21C:
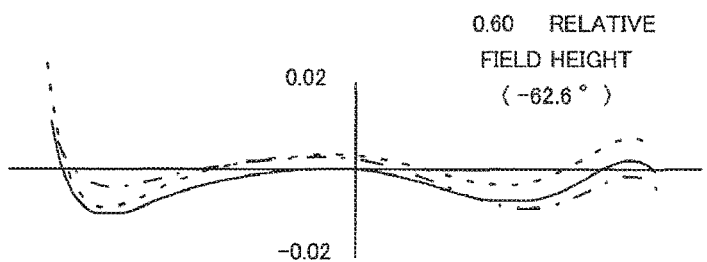
Figure 21C:
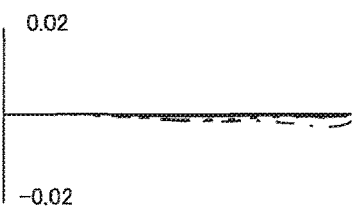
Figure 21D:
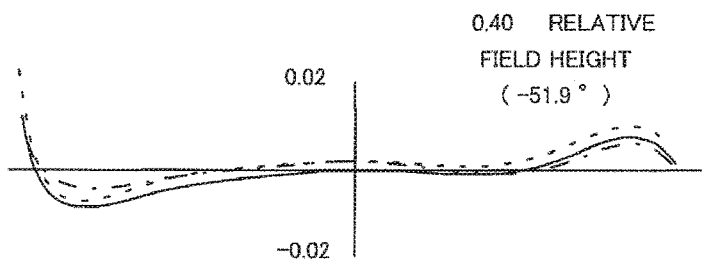
Figure 21D:
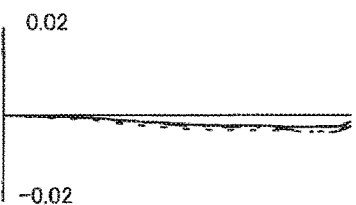
Figure 21E:
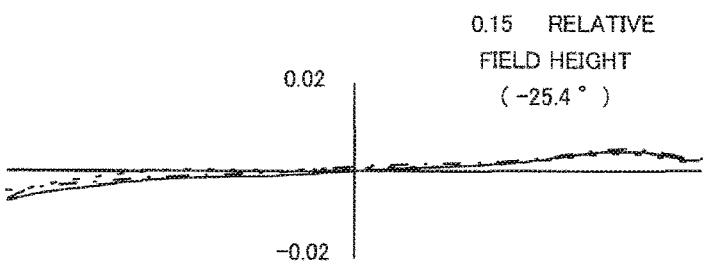
Figure 21E:
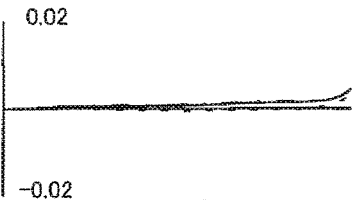
Figure 22A:
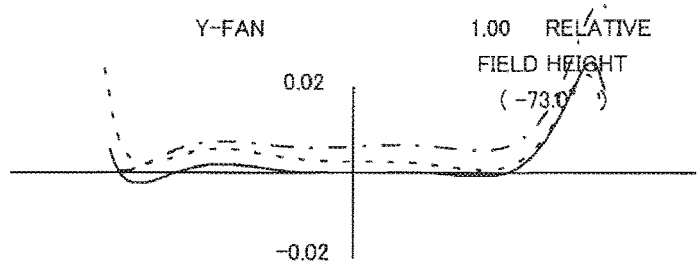
FIGS. 22(A) to 22(E) are lateral aberration diagrams of the projection optical system corresponding to FIG. 20(B).
Figure 22A:
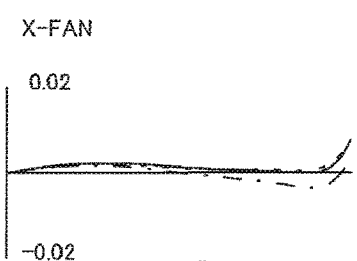
Figure 22B:
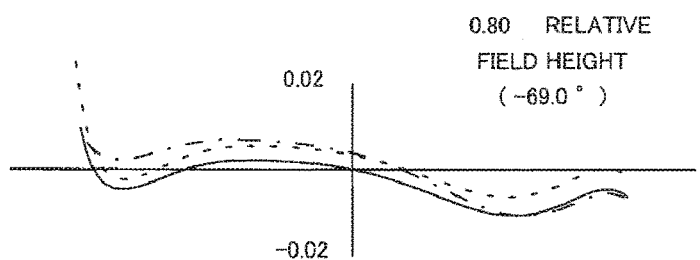
Figure 22B:
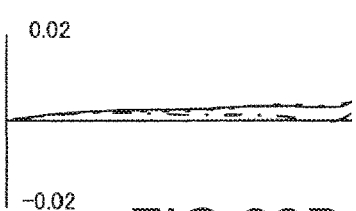
Figure 22C:
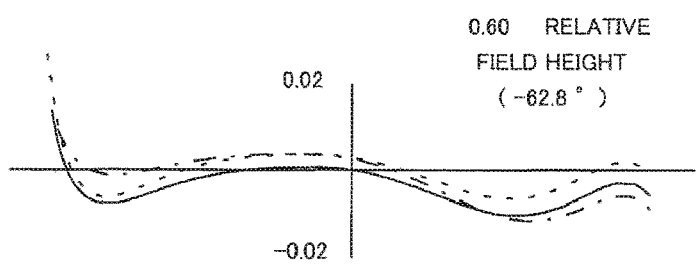
Figure 22C:
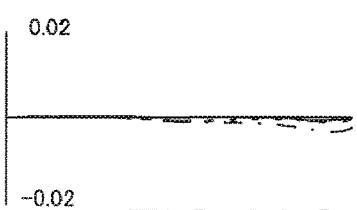
Figure 22D:
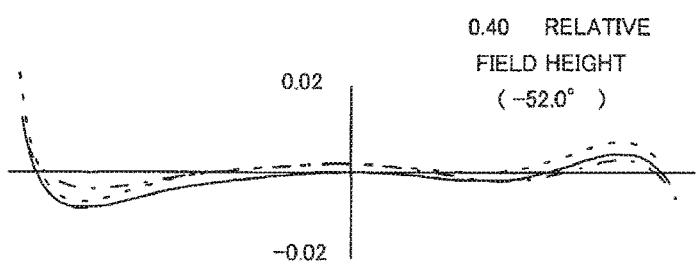
Figure 22D:
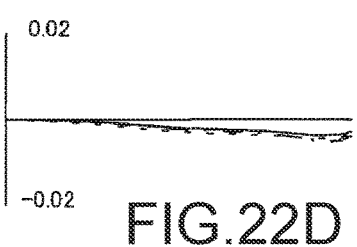
Figure 22E:
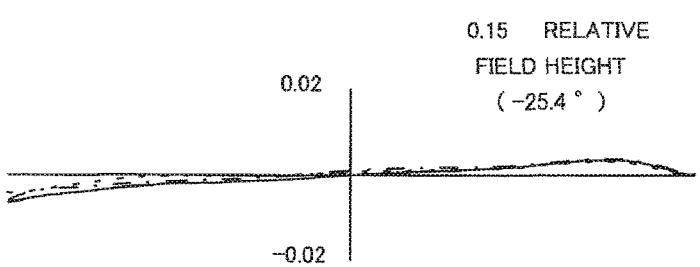
Figure 22E:
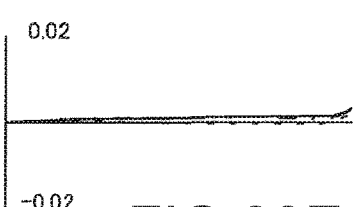
Figure 23A:
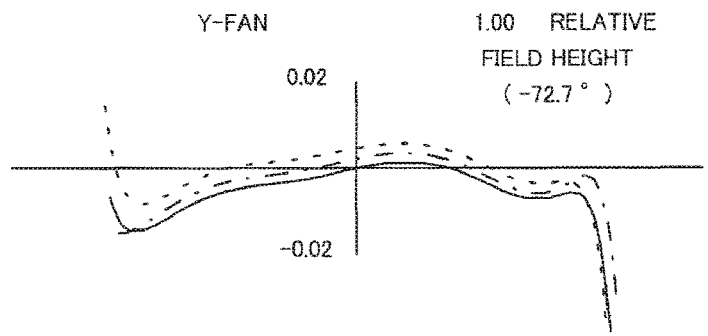
FIGS. 23(A) to 23(E) are lateral aberration diagrams of the projection optical system corresponding to FIG. 20(C).
Figure 23A:
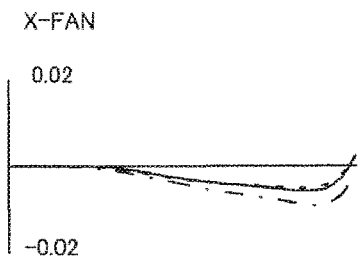
Figure 23B:
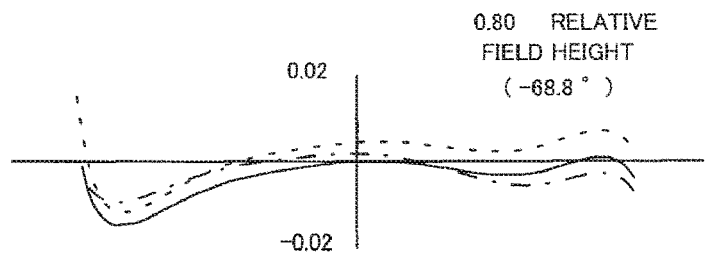
Figure 23B:
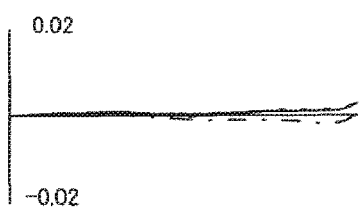
Figure 23C:
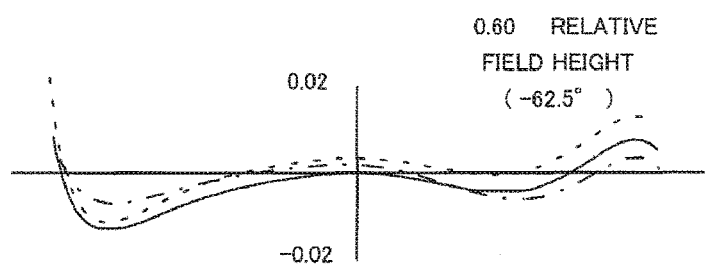
Figure 23C:
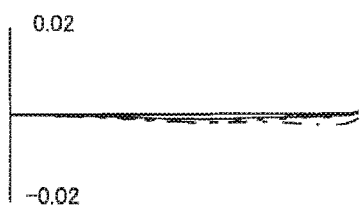
Figure 23D:
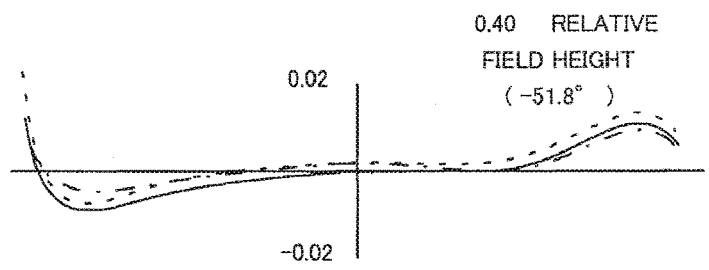
Figure 23D:
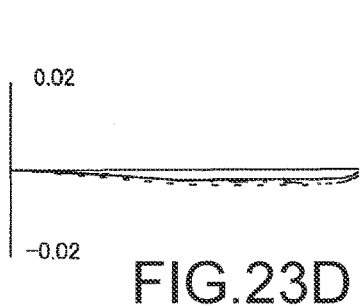
Figure 23E:
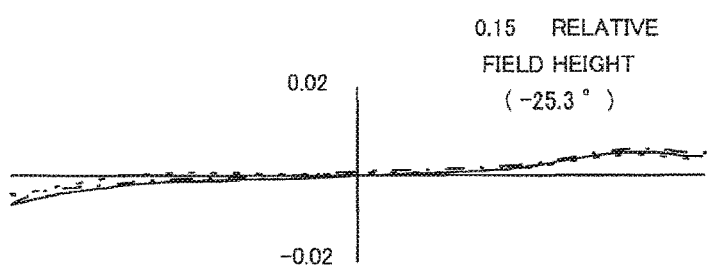
Figure 23E:
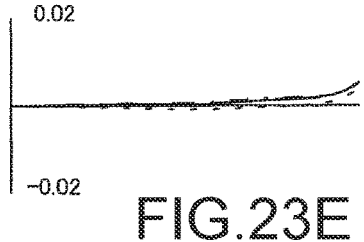

FIG. 20(A) is a reduction side aberration (spherical aberration, astigmatism, distortion aberration) diagram of the projection optical system when projection magnification is 125 times magnification, FIG. 20(B) is a reduction side aberration diagram of the projection optical system when projection magnification is 100 times magnification, and FIG. 20(C) is a reduction side aberration diagram of the projection optical system when projection magnification is 169 times magnification. FIGS. 21(A) to 21(E) are lateral aberration diagrams of the projection optical system corresponding to FIG. 20(A). FIGS. 21(A) to 21(E) represent lateral aberrations in the image heights of 100%, 80%, 60%, 40%, and 15%, respectively. FIG. 21(A) corresponds to a case of the maximum viewing angle. Similarly, FIGS. 22(A) to 22(E) are lateral aberration diagrams of the projection optical system corresponding to FIG. 20(B) and FIGS. 23(A) to 23(E) are lateral aberration diagrams of the projection optical system corresponding to FIG. 20(C).

Overview of Example

Also, in any of the examples, a simple configuration in which an aspherical lens made of resin is formed by only a single lens F3 (F3 lens) in the 1-2 lens group 42 and the 1-2 lens group 42, as a whole, is constituted with three lenses of positive, negative, and negative lenses of the lenses F1 to F3 which is the focus lens group while having a wide viewing angle of which a half viewing angle is greater than or equal to 70 degrees at a wide angle end is adopted. In this case, a mechanism moving the lenses F1 to F3 also can be formed by a relatively simple mechanism. The projection optical system 40 has a small lens configuration in which the number of lenses is 13 to 14 lenses as a whole.

The invention is not limited to the embodiment or examples described above and can be embodied in various aspects in a range without departing from the gist thereof.

For example, in the respective examples, it is possible to add one or more lenses not having substantially power before and after or between the lenses constituting each lens group.

A target to be expanded and projected by the projection optical system 40 is not limited to the liquid crystal panel and an image formed by a light modulating element such as a digital micromirror device which uses a micromirror as a pixel can be expanded and projected by the projection optical system 40.

The entire disclosure of Japanese Patent Application No. 2015-119003, filed Jun. 12, 2015 and Japanese Patent Application No. 2016-077075, filed Apr. 7, 2016 are expressly incorporated by reference herein.

The invention claimed is:

1. A projection optical system comprising:
in order from a reduction side,
a first optical group which has positive power and including a plurality of lenses; and
a second optical group which includes a single reflection surface having a concave aspherical shape, wherein
the first optical group includes a 1-1 lens group fixed at the time of focusing accompanying magnification change and having positive power and a 1-2 lens group moved at the time of focusing accompanying magnification change, bordering the widest air spacing,
the 1-2 lens group is constituted with three lenses of an F1 lens which includes a single positive lens having a convex surface to the reduction side, an F2 lens which includes a single negative meniscus lens having a convex surface to the enlargement side, and an F3 lens which includes a single negative lens, in order from the reduction side, and
an object side numerical aperture is greater than or equal to 0.3.

2. The projection optical system according to claim 1, wherein the 1-1 lens group includes an aperture stop inside the 1-1 lens group and includes a positive lens having a convex aspherical surface located at a position nearer to the reduction side than the aperture stop.

3. A projector comprising:
a light modulating element that modulates light from a light source and forms image light; and
a projection optical system according to claim 2 that projects image light from the light modulating element.

4. The projection optical system according to claim 1, wherein the 1-1 lens group includes an aperture stop inside the 1-1 lens group and includes a lens group including a positive lens located at a position nearer to the enlargement side than the aperture stop and having positive power.

5. A projector comprising:
a light modulating element that modulates light from a light source and forms image light; and
a projection optical system according to claim 4 that projects image light from the light modulating element.

6. The projection optical system according to claim 1, wherein the 1-1 lens group includes an aperture stop inside the 1-1 lens group and includes two positive lenses, a first cemented lens including a positive lens and a negative lens, and a second cemented lens including a positive lens and a negative lens located at a position nearer to the reduction side than the aperture stop.

7. A projector comprising:
a light modulating element that modulates light from a light source and forms image light; and
a projection optical system according to claim 6 that projects image light from the light modulating element.

8. The projection optical system according to claim 1, wherein the 1-1 lens group includes an aperture stop inside the 1-1 lens group and a negative lens having an aspherical shape on a surface of the negative lens is arranged in the vicinity of the aperture stop.

9. A projector comprising:
a light modulating element that modulates light from a light source and forms image light; and
a projection optical system according to claim 8 that projects image light from the light modulating element.

10. The projection optical system according to claim 1, wherein
the F1 lens, the F2 lens, and the F3 lens are divided into at least two lens groups, and
at least the two lens groups are respectively moved at the time of focusing accompanying the magnification change.

11. The projection optical system according to claim 1, wherein the F3 lens includes a both-side aspherical lens made from resin.

12. The projection optical system according to claim 1, wherein the F3 lens has a concave shape to the reduction side in the vicinity of the optical axis.

13. The projection optical system according to claim 1, wherein the reduction side is substantially telecentric.

14. The projection optical system according to claim 1, wherein all of elements constituting the first optical group and the second optical group are rotation symmetry systems.

15. The projection optical system according to claim 1, wherein a magnification change range is 1.5 times or more.

16. The projection optical system according to claim 1, wherein the 1-2 lens group has negative power as a whole.

17. A projector comprising:
a light modulating element that modulates light from a light source and forms image light; and
a projection optical system according to claim 1 that projects image light from the light modulating element.

* * * * *